US011318814B2

(12) United States Patent
Maeda

(10) Patent No.: US 11,318,814 B2
(45) Date of Patent: May 3, 2022

(54) COOLING APPARATUS

(71) Applicant: DENSO CORPORATION, Kariya (JP)

(72) Inventor: Takahiro Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 17/010,765

(22) Filed: Sep. 2, 2020

(65) Prior Publication Data

US 2020/0398639 A1 Dec. 24, 2020

Related U.S. Application Data

(63) Continuation of application No. PCT/JP2019/011946, filed on Mar. 21, 2019.

(30) Foreign Application Priority Data

Mar. 22, 2018 (JP) .............................. JP2018-054862

(51) Int. Cl.
  *F25D 17/00* (2006.01)
  *B60H 1/00* (2006.01)

(52) U.S. Cl.
  CPC ..... *B60H 1/00885* (2013.01); *B60H 1/00392* (2013.01); *B60H 1/00485* (2013.01)

(58) Field of Classification Search
  CPC ............ B60H 1/00885; B60H 1/00392; B60H 1/00485
  USPC ......................................................... 62/189
  See application file for complete search history.

(56) References Cited

U.S. PATENT DOCUMENTS

| 2003/0182955 A1* | 10/2003 | Hirao | B60H 1/00907 |
| | | | 62/202 |
| 2005/0115704 A1* | 6/2005 | Ito | B60H 1/0005 |
| | | | 165/202 |
| 2011/0307131 A1 | 12/2011 | Norden | |
| 2015/0121930 A1 | 5/2015 | Kasuya | |
| 2015/0152775 A1* | 6/2015 | Ando | F01P 7/165 |
| | | | 165/287 |
| 2018/0141410 A1* | 5/2018 | Kami | B60H 1/00921 |
| 2018/0170187 A1 | 6/2018 | Yang et al. | |

FOREIGN PATENT DOCUMENTS

| DE | 102011090147 A1 | 7/2013 |
| JP | 2012514556 A | 6/2012 |
| JP | 2014008857 A | 1/2014 |
| JP | 2017513453 A | 5/2017 |
| JP | 2019023059 A | 2/2019 |
| WO | WO-2011015426 A1 | 2/2011 |

* cited by examiner

*Primary Examiner* — Davis D Hwu
(74) *Attorney, Agent, or Firm* — Harness, Dickey & Pierce, P.L.C.

(57) ABSTRACT

A cooling apparatus includes: a water circuit; a ventilation heat exchanger that heats cooling water by heat exchange with air discharged to outside; a motor generator cooling unit; a motor bypass circuit that bypasses the motor generator cooling unit; and a flow rate control unit. When a temperature of the cooling water flowing between the ventilation heat exchanger and a motor flow rate controller is lower than or equal to a temperature of oil circulating inside the motor generator, the flow rate control unit increases a flow rate of the cooling water that flows from the ventilation heat exchanger into the motor bypass circuit.

5 Claims, 12 Drawing Sheets

US 11,318,814 B2

COOLING APPARATUS

CROSS REFERENCE TO RELATED APPLICATION

The present application is a continuation application of International Patent Application No. PCT/JP2019/011946 filed on Mar. 21, 2019, which designated the U.S. and claims the benefit of priority from Japanese Patent Application No. 2018-54862 filed on Mar. 22, 2018. The entire disclosures of all of the above applications are incorporated herein by reference.

TECHNICAL FIELD

The present disclosure relates to a cooling apparatus including a water circuit that circulates cooling water to cool a motor generator.

BACKGROUND

An air conditioner for a vehicle includes a ventilation heat exchanger in which heat is exchanged between refrigerant and warm air flowing out of a cabin to outside when the outside temperature is low. The heat of the air discharged from the cabin to the outside of the cabin is recovered by the refrigerant flowing through the ventilation heat exchanger.

SUMMARY

According to one aspect of the present disclosure, a cooling apparatus includes:
a water circuit configured to circulate cooling water to cool a motor generator that is a power source for traveling;
a ventilation heat exchanger in which heat is exchanged between the cooling water flowing through the water circuit and air discharged from inside of a cabin to outside of the cabin to heat the cooling water;
a motor generator cooling unit configured to cool the motor generator by heat exchange between the cooling water flowing out of the ventilation heat exchanger and the motor generator;
a motor bypass circuit that bypasses the motor generator cooling unit for the cooling water flowing out of the ventilation heat exchanger;
a motor flow rate controller configured to control a flow rate of the cooling water flowing from the ventilation heat exchanger to the motor generator cooling unit and a flow rate of the cooling water flowing from the ventilation heat exchanger to the motor bypass circuit;
a temperature determiner that determines whether a temperature of the cooling water flowing between the ventilation heat exchanger and the motor flow rate controller is higher than a temperature of oil circulating inside the motor generator; and
a flow rate control unit configured to control the motor flow rate controller to increase the flow rate of the cooling water flowing from the ventilation heat exchanger to the motor generator cooling unit when the temperature determiner determines that the temperature of the cooling water flowing between the ventilation heat exchanger and the motor flow rate controller is higher than the temperature of oil circulating inside the motor generator, and to control the motor flow rate controller to increase the flow rate of the cooling water flowing from the ventilation heat exchanger to the motor bypass circuit when the temperature determiner determines that the temperature of the cooling water flowing between the ventilation heat exchanger and the motor flow rate controller is lower than or equal to the temperature of oil circulating inside the motor generator.

DETAILED DESCRIPTION

Figure 1:
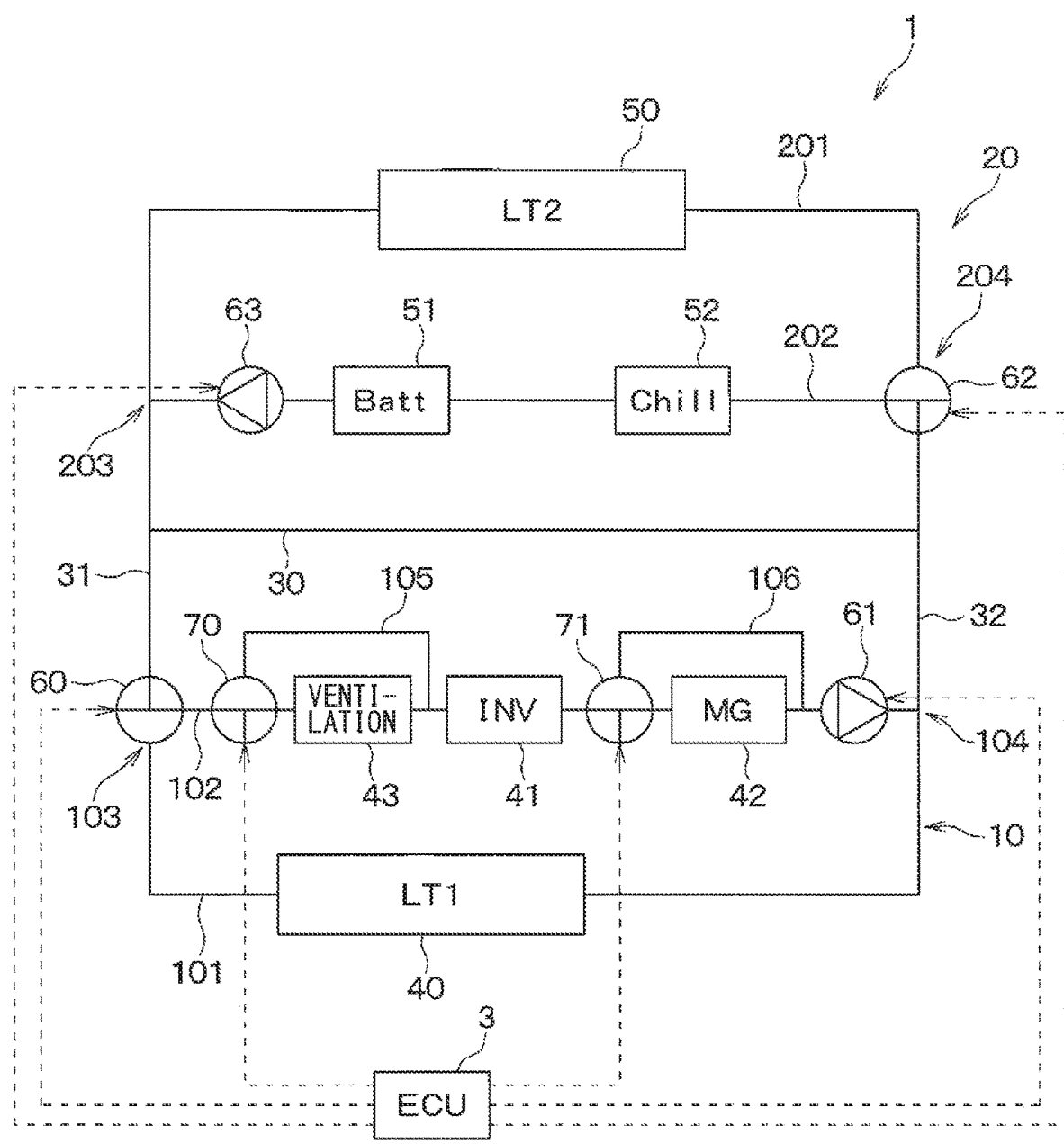
FIG. 1 is a block diagram illustrating a cooling water circuit of a cooling apparatus according to an embodiment.

To begin with, examples of relevant techniques will be described.
An air conditioner for a vehicle includes a ventilation heat exchanger in which heat is exchanged between refrigerant and warm air flowing out of a cabin to outside when the outside temperature is low. The heat of the air discharged from the cabin to the outside of the cabin is recovered by the refrigerant flowing through the ventilation heat exchanger, and is used to improve the heating capacity when the outside temperature is low.
The inventor arranges a ventilation heat exchanger and a motor generator cooling unit in a cooling water circuit that adjusts the temperatures of a motor, an inverter, a battery, etc., which are power sources for running a hybrid vehicle, a fuel cell vehicle, and the like. The ventilation heat exchanger is a water-air heat exchanger that exchanges heat between the air discharged from the cabin to the outside of the cabin and the cooling water to recover the heat of the air discharged to the outside of the cabin. In such a cooling water circuit, when the cabin is warmed, the cooling water is heated by the heat of the air discharged to the outside the cabin by the ventilation heat exchanger. The heated cooling water allows the motor generator cooling unit to quickly warm the oil circulating inside the motor generator.

However, according to the study by the inventor, even when the temperature of the cooling water flowing between the ventilation heat exchanger and the motor generator cooling unit is lower than the temperature of the oil circulating inside the motor generator, the cooling water flows into the motor generator cooling unit from the ventilation heat exchanger. In this case, the oil of the motor generator is cooled by the cooling water that has flowed into the motor generator cooling unit, and the friction loss of the motor generator increases.

According to one aspect of the present disclosure, a cooling apparatus includes:

a water circuit configured to circulate cooling water to cool a motor generator that is a power source for traveling;

a ventilation heat exchanger in which heat is exchanged between the cooling water flowing through the water circuit and air discharged from inside of a cabin to outside of the cabin to heat the cooling water;

a motor generator cooling unit configured to cool the motor generator by heat exchange between the cooling water flowing out of the ventilation heat exchanger and the motor generator;

a motor bypass circuit that bypasses the motor generator cooling unit for the cooling water flowing out of the ventilation heat exchanger;

a motor flow rate controller configured to control a flow rate of the cooling water flowing from the ventilation heat exchanger to the motor generator cooling unit and a flow rate of the cooling water flowing from the ventilation heat exchanger to the motor bypass circuit;

a temperature determiner that determines whether a temperature of the cooling water flowing between the ventilation heat exchanger and the motor flow rate controller is higher than a temperature of oil circulating inside the motor generator; and a flow rate control unit configured to control the motor flow rate controller to increase the flow rate of the cooling water flowing from the ventilation heat exchanger to the motor generator cooling unit when the temperature determiner determines that the temperature of the cooling water flowing between the ventilation heat exchanger and the motor flow rate controller is higher than the temperature of oil circulating inside the motor generator, and to control the motor flow rate controller to increase the flow rate of the cooling water flowing from the ventilation heat exchanger to the motor bypass circuit when the temperature determiner determines that the temperature of the cooling water flowing between the ventilation heat exchanger and the motor flow rate controller is lower than or equal to the temperature of oil circulating inside the motor generator.

Accordingly, the cooling water is heated by heat exchange between the cooling water flowing through the water circuit and the air discharged from the cabin to the outside of the cabin in the ventilation heat exchanger, so that energy efficiency can be improved.

Furthermore, the flow rate control unit controls the motor flow rate controller to increase the flow rate of the cooling water flowing from the ventilation heat exchanger to the motor generator cooling unit when the temperature determiner determines that the temperature of the cooling water flowing between the ventilation heat exchanger and the motor flow rate controller is higher than the temperature of oil circulating inside the motor generator, and the flow rate control unit controls the motor flow rate controller to increase the flow rate of the cooling water flowing from the ventilation heat exchanger to the motor bypass circuit when the temperature determiner determines that the temperature of the cooling water flowing between the ventilation heat exchanger and the motor flow rate controller is lower than or equal to the temperature of oil circulating inside the motor generator. Therefore, it is possible to restrict the oil of the motor generator from being cooled by the cooling water, such that it is possible to reduce the friction loss of the motor generator.

According to another aspect, a cooling apparatus includes: a water circuit configured to circulate cooling water to cool a motor generator that is a power source for traveling; a ventilation heat exchanger in which heat is exchanged between the cooling water flowing through the water circuit and air discharged from inside of a cabin to outside of the cabin to heat the cooling water; a motor generator cooling unit configured to cool the motor generator by heat exchange between the cooling water flowing out of the ventilation heat exchanger and the motor generator; a motor bypass circuit that bypasses the motor generator cooling unit for the cooling water flowing out of the ventilation heat exchanger; a motor flow rate controller configured to control a flow rate of the cooling water flowing from the ventilation heat exchanger to the motor generator cooling unit and a flow rate of the cooling water flowing from the ventilation heat exchanger to the motor bypass circuit; and a control unit configured to control the motor flow rate controller.

In this way, the ventilation heat exchanger heats the cooling water by heat exchange between the cooling water flowing in the water circuit and the air discharged from the cabin to the outside of the cabin, so that the energy efficiency can be improved.

In addition, the control unit can control the motor flow rate controller to increase the flow rate of the cooling water flowing from the ventilation heat exchanger to the motor generator cooling unit, or to increase the flow rate of the cooling water flowing from the ventilation heat exchanger to the motor bypass circuit. Therefore, it is possible to restrict the oil of the motor generator from being cooled by the cooling water, so that it is possible to reduce the friction loss of the motor generator.

Figure 14:
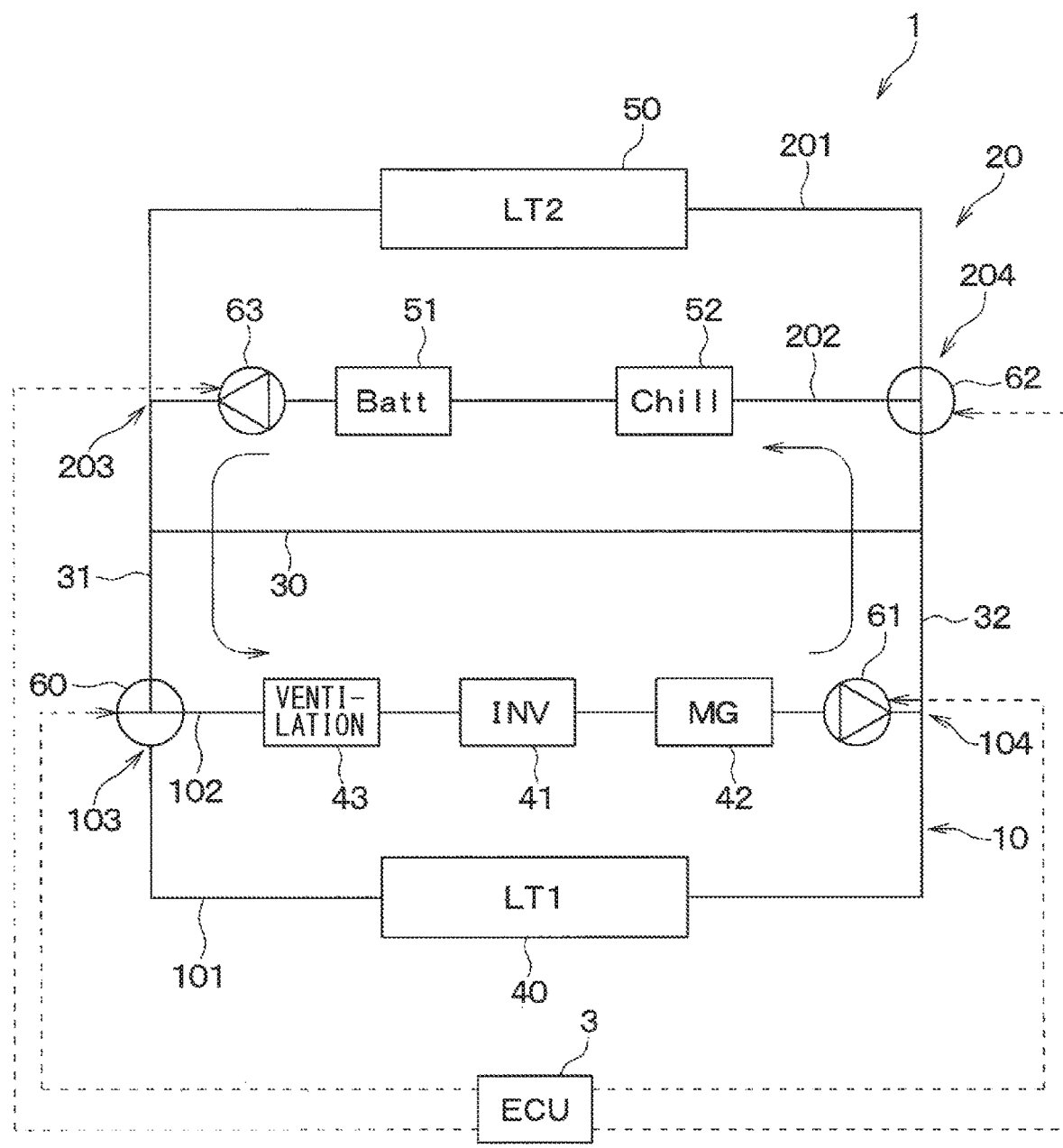
FIG. 14 is a diagram for explaining a comparison example.

Issues to be solved by an embodiment will be described below. A cooling apparatus of a comparison example shown in FIG. 14 is studied by the inventor to adjust the temperature of a motor, an inverter, a battery and the like, which are power sources for running an electric vehicle, a hybrid vehicle, a fuel cell vehicle and the like. The cooling apparatus includes a first circuit 10, a second circuit 20, a bypass passage 30, a first connection passage 31, a second connection passage 32, and an ECU 3 as a control unit. The cooling apparatus is configured such that cooling water circulates through the first circuit 10, the second circuit 20, the bypass passage 30, the first connection passage 31, and the second connection passage 32.

A first switching valve 60, a ventilation heat exchanger 43, an inverter cooling unit 41 that cools an inverter, a motor generator cooling unit 42 that cools a motor generator, a first pump 61, and a first radiator 40 are arranged in the first circuit 10.

The second circuit 20 includes a second switching valve 62, a chiller 52 for cooling the cooling water, a battery cooling unit 51 for cooling the battery, a second pump 63 and a second radiator 50.

The chiller 52 is a part of an air conditioner for a vehicle, and is a water-refrigerant heat exchanger that exchanges heat between the refrigerant used in the air conditioner and the cooling water flowing through the second circuit 20. The ventilation heat exchanger 43 is a water-air heat exchanger that exchanges heat between the air discharged from the cabin to the outside and the cooling water to recover the heat of the air discharged to the outside of the cabin. The ECU 3 controls the first switching valve 60 and the second switching valve 62 so that the flow path of the cooling water varies depending on the outside air temperature and the like.

When the outside temperature is low, as shown in FIG. 14, the switching valves 60 and 62 are controlled so that the cooling water flows in a predetermined order of the chiller 52, the battery cooling unit 51, the first switching valve 60, the ventilation heat exchanger 43, the inverter cooling unit 41, the motor generator cooling unit 42, the first pump 61, the second switching valve 62 and the chiller 52.

When the cabin is warmed while the outside temperature is low, the ventilation heat exchanger 43 recovers the heat of air discharged from the cabin to the outside of the cabin, to improve energy efficiency. When the outside air temperature is low, the viscous resistance of the oil of the motor generator increases and the friction loss of the motor generator increases. When the temperature is extremely low, the viscous resistance of the oil of the motor generator becomes very high, and the friction loss of the motor generator becomes large. Since the cooling water circuit 1 includes the ventilation heat exchanger 43, when the cabin becomes warm, the cooling water is heated by the heat of the air discharged to the outside by the ventilation heat exchanger 43, and it is possible to quickly warm the oil circulating inside the motor generator.

However, in the configuration shown in FIG. 14, the temperature of the cooling water flowing between the ventilation heat exchanger 43 and the motor generator cooling unit 42 may be lower than the temperature of the oil circulating inside the motor generator. Also in that case, the cooling water flowing out of the ventilation heat exchanger 43 flows into the motor generator cooling unit 42 through the inverter cooling unit 41.

Since the oil of the motor generator is cooled by the cooling water that has flowed into the motor generator cooling unit 42, the friction loss of the motor generator is increased. The present embodiment aims to improve the energy efficiency and reduce the friction loss of a motor generator.

Hereinafter, embodiments will be described with reference to the drawings. In the following embodiments, the same reference numeral is given to the same or equivalent parts in the drawings.

A cooling apparatus according to an embodiment will be described with reference to FIGS. 1 to 13. The cooling apparatus of the present embodiment includes a cooling water circuit 1 configured to lower the temperature of a battery, a motor generator, and an inverter mounted on a vehicle such as an electric vehicle using cooling water.

As shown in FIG. 1, the cooling water circuit 1 includes a first circuit 10, a second circuit 20, and an ECU 3 that is an electronic control unit. The first circuit 10 has a first cooling water channel 101 and a second cooling water channel 102. The cooling water circulates in the first circuit 10.

The first cooling water channel 101 and the second cooling water channel 102 are connected by a first connection 103 and a third connection 104. The first connection 103 has a first switching valve 60 controlled by the ECU 3.

A first radiator 40 is provided in the first cooling water channel 101. The first radiator 40 is a heat exchanger that exchanges heat between the cooling water passing through the first cooling water channel 101 and the outside air.

The second cooling water channel 102 has a ventilation heat exchanger 43, an inverter cooling unit 41, a motor generator cooling unit 42, and a first pump 61 controlled by the ECU 3.

A vehicle equipped with the cooling water circuit 1 has an exhaust passage through which air in the cabin is discharged to the outside of the cabin. When an outside air mode is set in which the outside air is taken into the cabin, the air in the cabin is exhausted to the outside of the cabin through the exhaust passage.

The ventilation heat exchanger 43 is arranged in the exhaust passage that discharges air from the cabin to the outside of the cabin. The ventilation heat exchanger 43 recovers heat of air in the exhaust passage by heat exchange between the air flowing in the exhaust passage and the cooling water flowing in the second cooling water channel 102.

The inverter cooling unit 41 cools an inverter that converts the direct current supplied from the battery into an alternating current to supply the alternating current to the motor generator. The motor generator cooling unit 42 cools the motor generator that serves as a power source for traveling.

The motor generator is a rotary motor configured to exert a driving force and generate electric power. The allowable water temperature of the cooling water circuit for cooling the inverter and the motor generator is generally about 60° C.

The first pump 61 generates a flow of cooling water flowing through the ventilation heat exchanger 43, the inverter cooling unit 41, and the motor generator cooling unit 42. In the present embodiment, the first pump 61 is arranged such that the cooling water flows from the first connection 103 through the ventilation heat exchanger 43, the inverter cooling unit 41, and the motor generator cooling unit 42 to the third connection 104.

A third switching valve 70 controlled by the ECU 3 is provided between the first connection 103 and the inverter cooling unit 41. A ventilation bypass circuit 105 is provided between the first connection 103 and the inverter cooling unit 41 to bypass the ventilation heat exchanger 43 for the cooling water from the first connection 103.

A fourth switching valve 71 controlled by the ECU 3 and a motor bypass circuit 106 that bypasses the motor generator cooling unit 42 for the cooling water from the inverter cooling unit 41 are provided between the inverter cooling unit 41 and the first pump 61. The fourth switching valve 71 corresponds to a motor flow rate controller.

The second circuit 20 has a third cooling water channel 201 and a fourth cooling water channel 202, and the cooling water circulates in the second circuit 20. The third cooling water channel 201 and the fourth cooling water channel 202 are connected by the second connection 203 and the fourth connection 204. The fourth connection 204 has a second switching valve 62 controlled by the ECU 3.

The second radiator 50 is provided in the third cooling water channel 201. The second radiator 50 is a heat exchanger that exchanges heat between the cooling water passing through the third cooling water channel 201 and the outside air.

The fourth cooling water channel 202 has a battery cooling unit 51, a chiller 52, and a second pump 63 controlled by the ECU 3. The battery cooling unit 51 cools the battery that supplies electric power to the inverter and the like. The allowable water temperature of the cooling water circuit for cooling the battery is generally about 30° C.

The chiller 52 is a part of an air conditioner for the cabin, and includes a water-refrigerant heat exchanger that exchanges heat between the refrigerant used in the air conditioner and the cooling water flowing through the second circuit 20.

The second pump 63 generates a flow of cooling water flowing through the battery cooling unit 51 and the chiller 52. In the present embodiment, the second pump 63 is arranged such that the cooling water flows from the fourth connection 204 through the chiller 52 and the battery cooling unit 51 to the second connection 203.

The first circuit 10 and the second circuit 20 are connected by a first connection passage 31 and a second connection passage 32. The first connection passage 31 connects the first connection 103 and the second connection 203. The first connection 103 is a cooling water passage connected to one outflow/inflow side of the first radiator 40. The second connection passage 32 is a cooling water passage connected to one outflow/inflow side of the second radiator 50.

The second connection passage 32 connects the third connection 104 and the fourth connection 204. The third connection 104 is a cooling water passage connected to the other inflow/outflow side of the first radiator 40. The fourth connection 204 is a cooling water passage connected to the other outflow/inflow side of the second radiator 50. In the present embodiment, the bypass passage 30 is provided to connect the first connection passage 31 and the second connection passage 32.

The ECU 3 includes a computer having a CPU, a RAM, a ROM, and an I/O. The CPU carries out various processes according to a program stored in the ROM. The ROM and the RAM are non-transitory tangible storage media.

The ECU 3 receives a signal indicating the temperature inside the cabin, a signal indicating the temperature of the cooling water flowing into the ventilation heat exchanger 43, a signal indicating the temperature of the cooling water flowing into the motor generator cooling unit 42, and a signal indicating the temperature of the oil circulating inside the motor generator. The signal is input from a temperature sensor (not shown) provided in the ventilation heat exchanger 43, the motor generator cooling unit 42, and the motor generator.

The temperature sensor that outputs a signal indicating the temperature inside the cabin can be arranged in the cabin or in the exhaust passage that discharges air from the cabin to the outside. The temperature sensor that outputs a signal indicating the temperature of the cooling water flowing into the ventilation heat exchanger 43 can be arranged between the first connection 103 and the ventilation heat exchanger 43. The temperature sensor that outputs a signal indicating the temperature of the cooling water flowing into the motor generator cooling unit 42 can be arranged between the ventilation heat exchanger 43 and the fourth switching valve 71. The temperature sensor that outputs a signal indicating the temperature of the oil circulating inside the motor generator can be arranged in the motor generator.

Next, the operation of the cooling water circuit 1 when the outside temperature is high will be described with reference to FIG. 2. The outside temperature is high when, for example, the outside air temperature is equal to or higher than 35° C., in other words, when the outside air temperature exceeds the allowable water temperature 30° C. of the battery.

Figure 2:
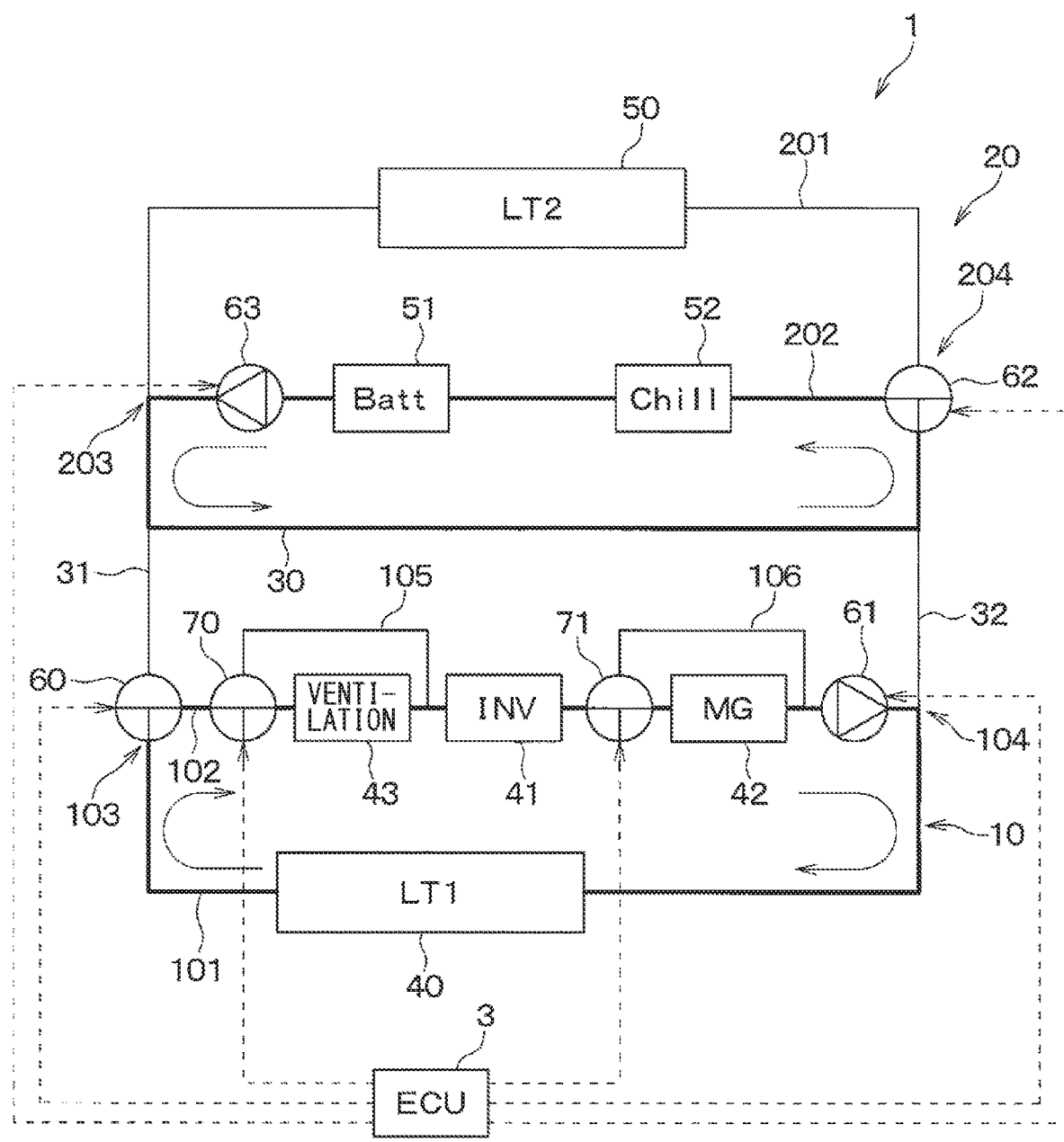
FIG. 2 is a diagram for explaining an operation of the cooling water circuit when the outside temperature is high.

As shown in FIG. 2, the first switching valve 60 is controlled so as to close the first connection passage 31 and circulate the cooling water in the first circuit 10. The second switching valve 62 is controlled so as to close the third cooling water channel 201 and circulate the cooling water in the fourth cooling water channel 202 and the second connection passage 32.

The third switching valve 70 is controlled so as to close the ventilation bypass circuit 105 so that the cooling water flows into the ventilation heat exchanger 43. The fourth switching valve 71 is controlled so as to close the motor bypass circuit 106 so that the cooling water flows into the motor generator cooling unit 42. The third switching valve 70 corresponds to a ventilation flow rate controller.

Since the first switching valve 60 closes the first connection passage 31, the cooling water flowing from the fourth cooling water channel 202 into the first connection passage 31 passes through the bypass passage 30 and the second connection passage 32 and returns to the fourth cooling water channel 202.

When the first pump 61 is driven, the cooling water circulates in the first circuit 10, and the cooling water cooled by the first radiator 40 can be supplied to the inverter cooling unit 41 and the motor generator cooling unit 42. Therefore, the inverter and the motor generator can be cooled.

When the second pump 63 is driven, the cooling water circulates from the fourth cooling water channel 202 of the second circuit 20 through the first connection passage 31, the bypass passage 30, and the second connection passage 32. Thus, the cooling water cooled by the chiller 52 can be supplied to the battery cooling unit 51. Therefore, the battery can be cooled.

Next, the operation of the cooling water circuit 1 when the outside temperature is medium will be described with reference to FIG. 3. The outside air temperature is medium, for example, when the air temperature is about 25° C., in other words, when the outside air temperature is lower than the allowable water temperature 30° C. of the battery.

Figure 3:
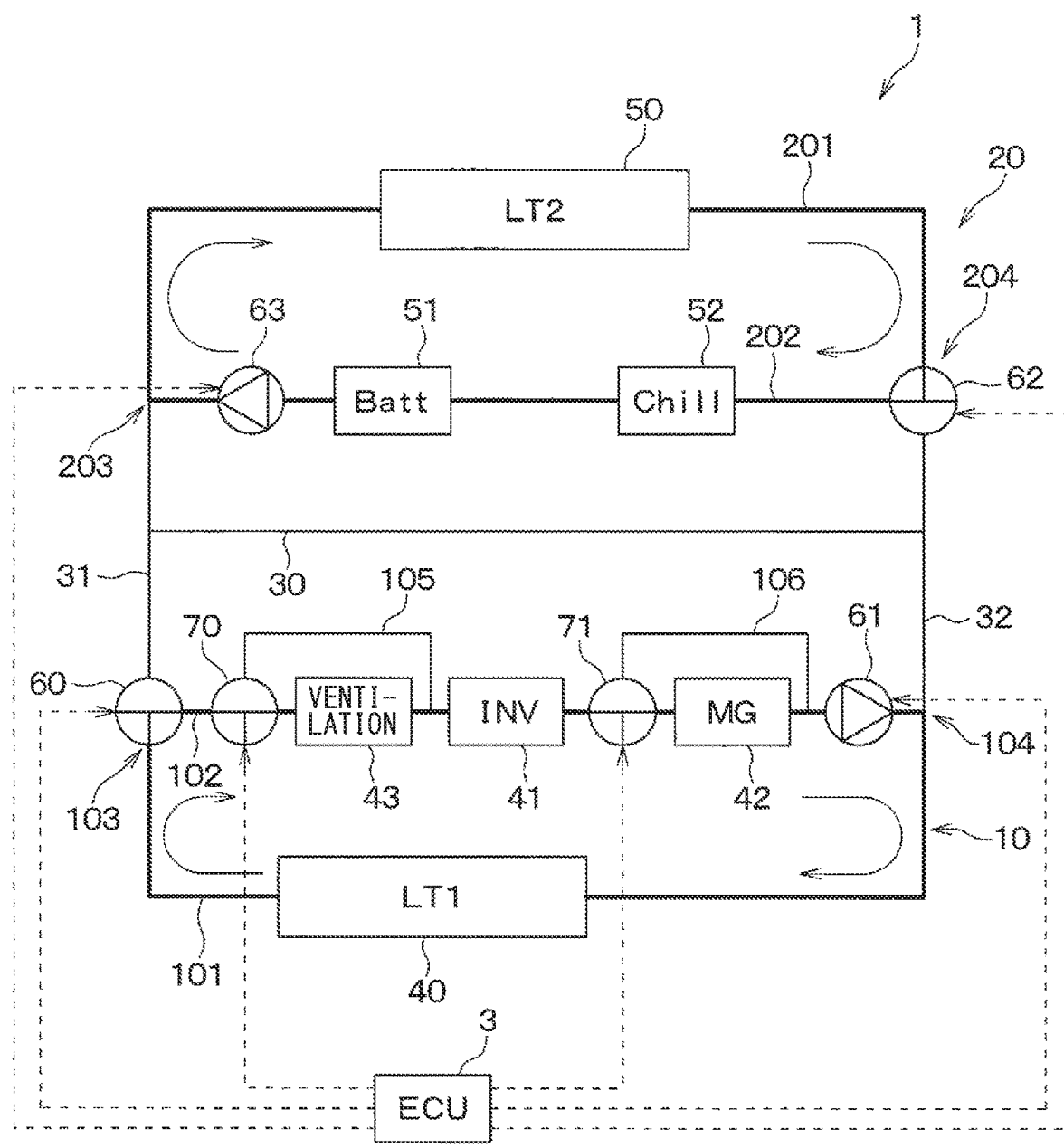
FIG. 3 is a diagram for explaining an operation of the cooling water circuit when the outside temperature is medium.

As shown in FIG. 3, the first switching valve 60 is controlled so as to close the first connection passage 31 and circulate the cooling water in the first circuit 10. The second switching valve 62 is controlled so as to close the second connection passage 32 so that the cooling water circulates in the second circuit 20. Therefore, the cooling water does not flow into the first connection passage 31 and the second connection passage 32, and the cooling water does not flow into the bypass passage 30.

The third switching valve 70 is controlled so as to close the ventilation bypass circuit 105 so that the cooling water flows into the ventilation heat exchanger 43. The fourth switching valve 71 is controlled so as to close the motor bypass circuit 106 so that the cooling water flows into the motor generator cooling unit 42.

The cooling water circulates in the first circuit 10 by driving the first pump 61, and the cooling water cooled by the first radiator 40 is supplied to the ventilation heat exchanger 43, the inverter cooling unit 41, and the motor generator cooling unit 42. Therefore, the inverter and the motor generator can be cooled.

The cooling water circulates in the second circuit 20 by driving the second pump 63, and the cooling water cooled by the second radiator 50 and the chiller 52 can be supplied to the battery cooling unit 51. Therefore, the battery can be cooled. In some cases, the air conditioner is not operating such that the chiller 52 is not supplied with the cooled refrigerant when the outside temperature is medium. In that case, the cooling water is cooled only by the second radiator 50.

Next, the operation of the cooling water circuit 1 when the battery is rapidly charged will be described with reference to FIG. 4. Since the battery rapidly generates heat during the rapid charging of the battery, all the elements of the cooling water circuit 1 are utilized to cool the battery.

Figure 4:
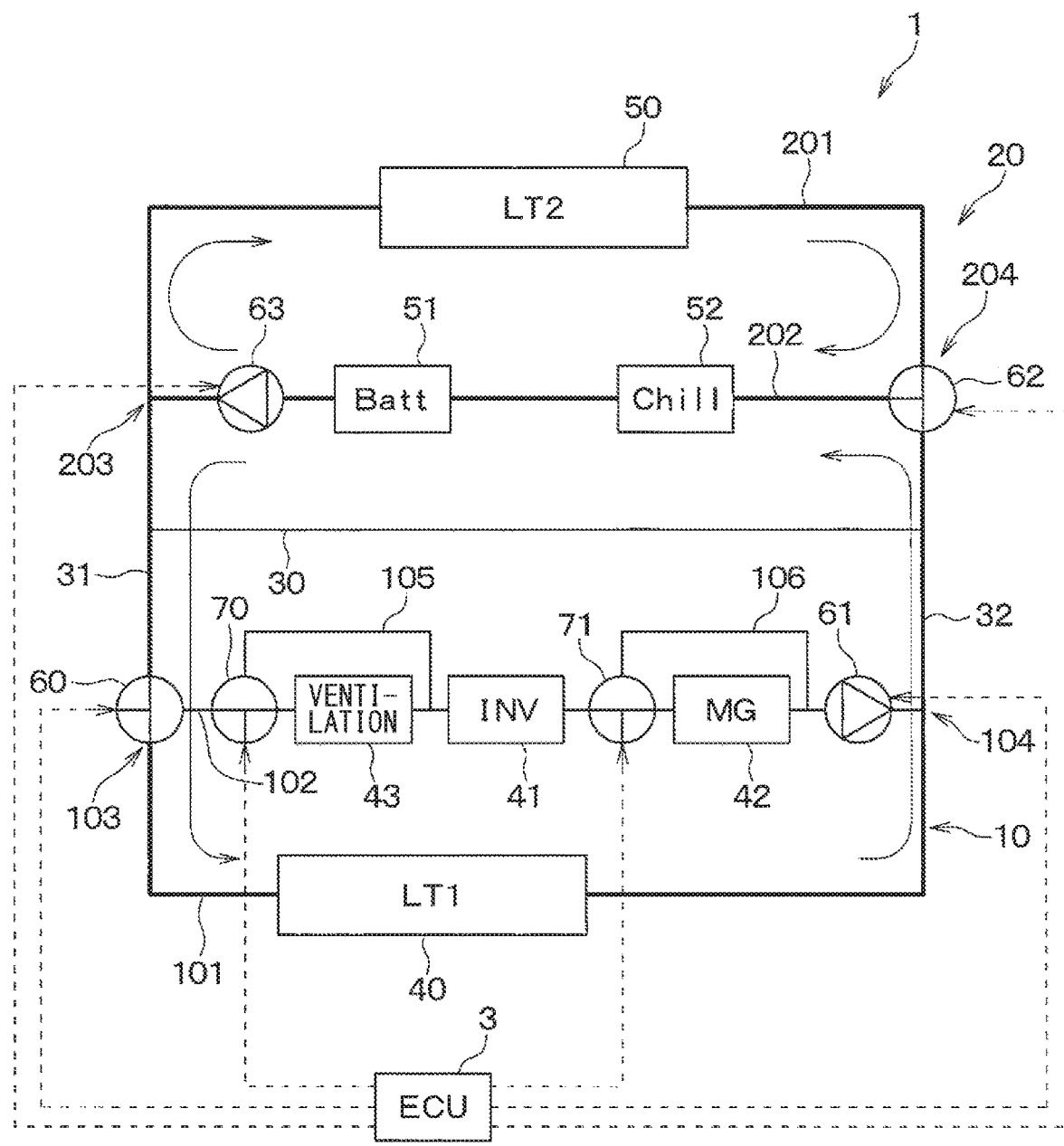
FIG. 4 is a diagram for explaining an operation during rapid charging of a battery.

As shown in FIG. 4, the first switching valve 60 is controlled so as to close the second cooling water channel 102 and allow the cooling water to flow into the first cooling water channel 101 and the first connection passage 31. The second switching valve 62 is controlled so as to open the third cooling water channel 201, the fourth cooling water channel 202, and the second connection passage 32 in all directions.

The cooling water flowing through the fourth cooling water channel 202 is divided into the third cooling water channel 201 and the first connection passage 31 by driving the second pump 63. The heat of the cooling water that has flowed into the third cooling water channel 201 is exchanged in the second radiator 50, and the temperature of the cooling water decreases. Then, the cooling water flows back into the fourth cooling water channel 202. The heat of the cooling water that has flowed into the first connection passage 31 is exchanged in the first radiator 40, and the temperature of the cooling water decreases. Then, the cooling water flows back into the fourth cooling water channel 202. The cooling water that has returned to the fourth cooling water channel 202 is further cooled in the chiller 52 and supplied to the battery cooling unit 51.

Next, the operation of the cooling water circuit 1 when the outside temperature is low will be described with reference to FIG. 5. The outside temperature is low, for example, when the outside air temperature is about 5° C. and both the battery and the motor generator need to be warmed up.

Figure 5:
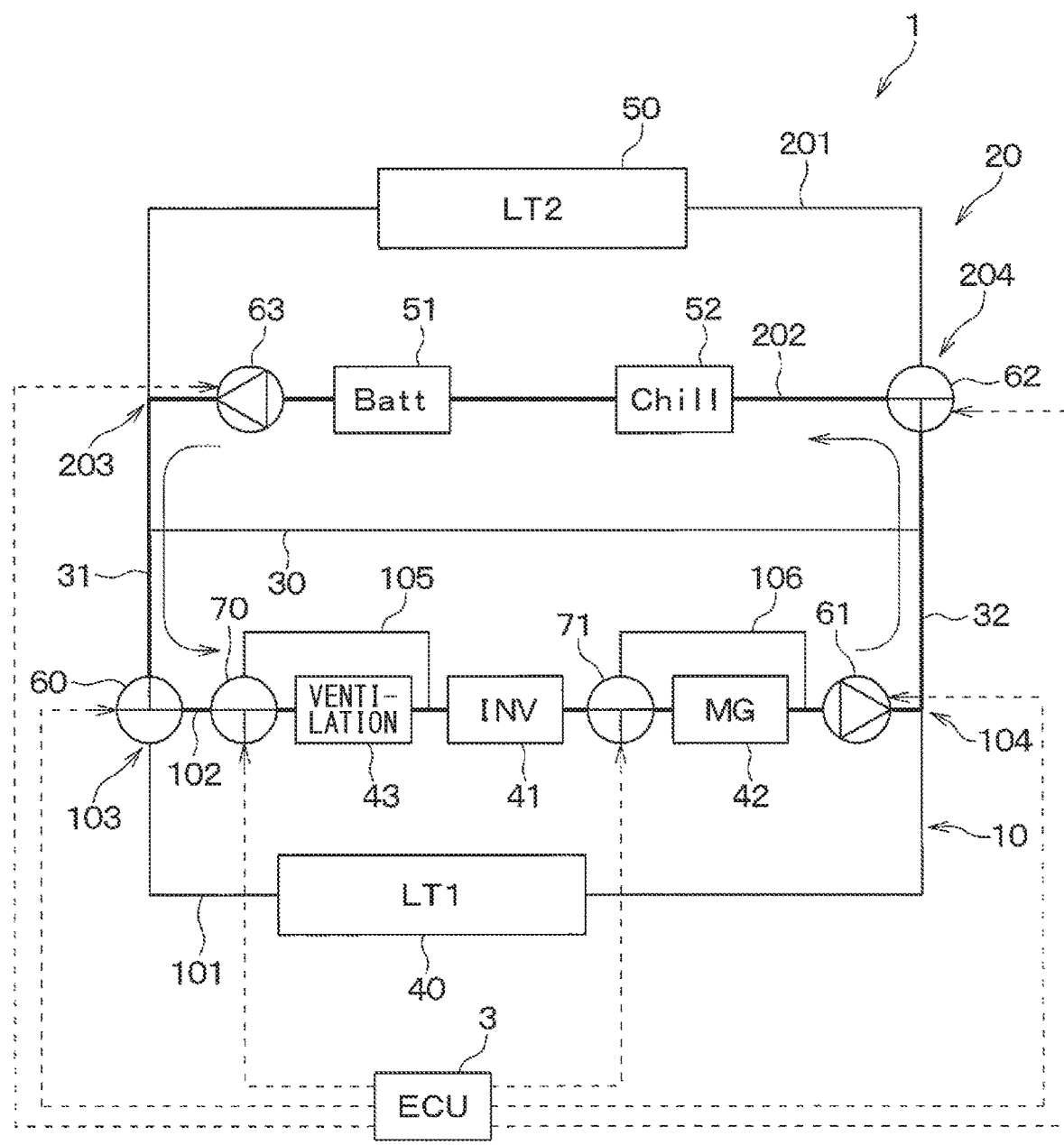
FIG. 5 is a diagram for explaining an operation when the outside temperature is low.

As shown in FIG. 5, the first switching valve 60 is controlled so as to close the first cooling water channel 101 and circulate the cooling water to the second cooling water channel 102 and the first connection passage 31. The second switching valve 62 is controlled so as to close the third cooling water channel 201 and circulate the cooling water toward the second connection passage 32.

The third switching valve 70 is controlled so as to close the ventilation bypass circuit 105 so that the cooling water flows into the ventilation heat exchanger 43. The fourth switching valve 71 is controlled so as to close the motor bypass circuit 106 so that cooling water flows into the motor generator cooling unit 42.

When the first pump 61 and the second pump 63 are driven, the cooling water flows from the second cooling water channel 102 of the first circuit 10 through the second connection passage 32, and flows from the fourth cooling water channel 202 of the second circuit 20 through the connection passage 31, so as to flow back to the first circuit 10. Therefore, the heat generated in all the devices can be used for the warming. After the warming is completed, the temperature of the cooling water is high, so that the heat can be transferred to the refrigerant in the chiller 52 and the heat can be used for a heating operation of the air conditioner.

The cooling water is cooled by the chiller 52, so that the ventilation heat exchanger 43 can efficiently recover the heat of the air discharged from the cabin to the outside of the cabin.

The following two points are to be considered for the ventilation heat exchanger 43 to efficiently recover the heat of the air discharged from the cabin to the outside when the outside temperature is low.

(1) When the air temperature in the cabin is lower than the temperature of the cooling water flowing through the ventilation heat exchanger 43, the cooling water is not circulated through the ventilation heat exchanger 43.

That is, when the temperature of the air in the cabin is lower than the temperature of the cooling water flowing through the ventilation heat exchanger 43, the ventilation heat exchanger 43 cannot efficiently recover the heat of the air discharged from the cabin to the outside of the cabin. On the contrary, the heat of the cooling water flowing into the ventilation heat exchanger 43 is discarded. Therefore, it is preferable not to circulate the cooling water in the ventilation heat exchanger 43.

(2) When the temperature of the cooling water flowing into the motor generator cooling unit 42 is lower than the temperature of the oil circulating inside the motor generator, the cooling water is not circulated in the motor generator cooling unit 42.

That is, when the temperature of the cooling water flowing into the motor generator cooling unit 42 is lower than the temperature of the oil circulating inside the motor generator, the cooling water flowing into the motor generator cooling unit 42 cools the oil of the motor generator. Therefore, the friction loss of the motor generator becomes large. Therefore, it is preferable not to circulate the cooling water in the motor generator cooling unit 42. However, this is not the case when the temperature of the oil circulating inside the motor generator exceeds a threshold value and the cooling is required.

The cooling apparatus of the present embodiment includes the ventilation bypass circuit 105 and the motor bypass circuit 106, and it is possible to prohibit the cooling water from flowing into the ventilation heat exchanger 43 and the motor generator cooling unit 42.

Figure 6:
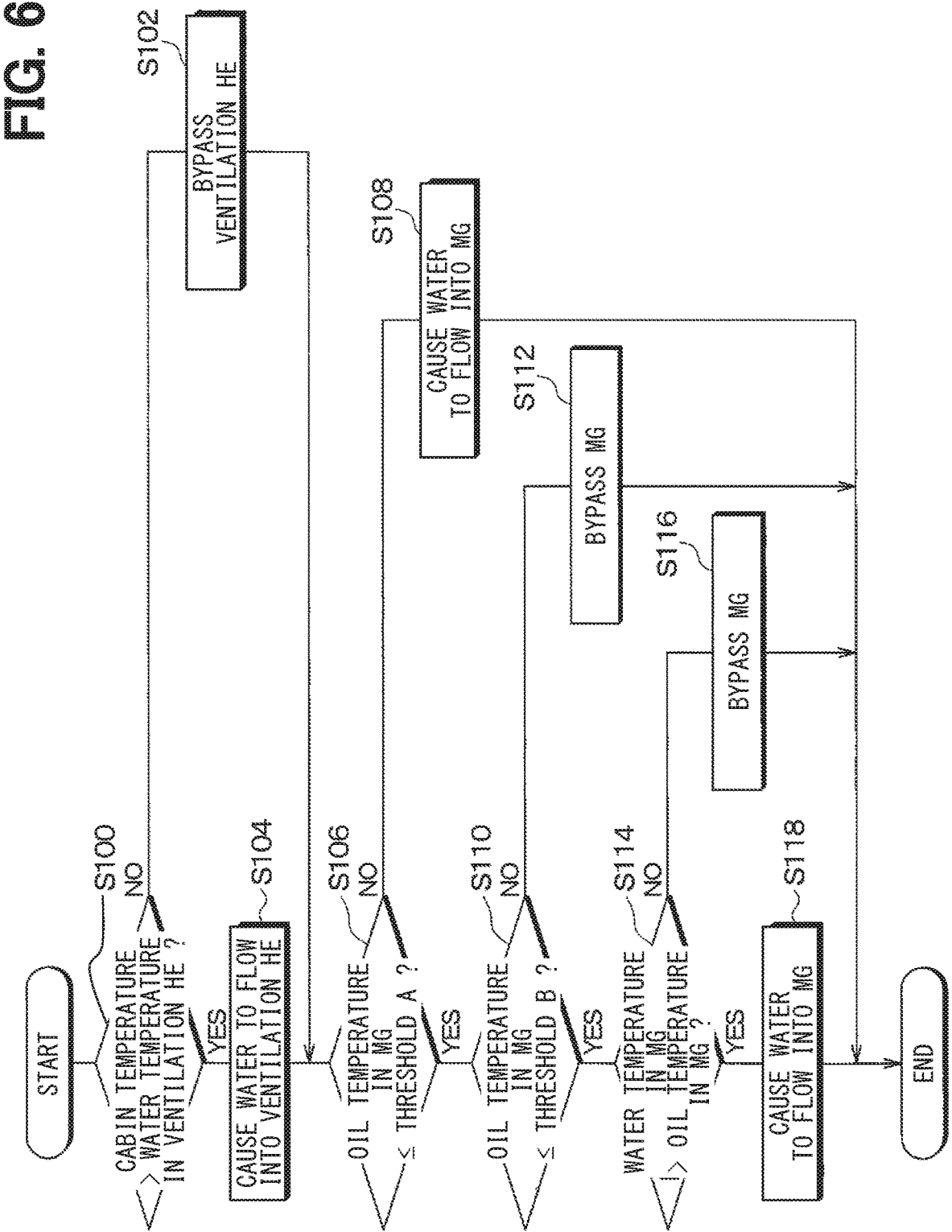
FIG. 6 is a flowchart of an ECU.

Next, the processing of the ECU 3 will be described with reference to FIG. 6. The ECU 3 periodically executes the processing shown in FIG. 6.

First, in S100, the ECU 3 determines whether or not the cabin temperature is higher than the temperature of the cooling water flowing into the ventilation heat exchanger 43. Specifically, the temperature inside the cabin is specified based on the signal indicating the temperature inside the cabin, and the temperature of the cooling water that flows into the ventilation heat exchanger 43 is specified based on the signal indicating the temperature of the cooling water that flows into the ventilation heat exchanger 43. Then, it is determined whether the temperature inside the cabin is higher than the temperature of the cooling water flowing into the ventilation heat exchanger 43.

Figure 7:
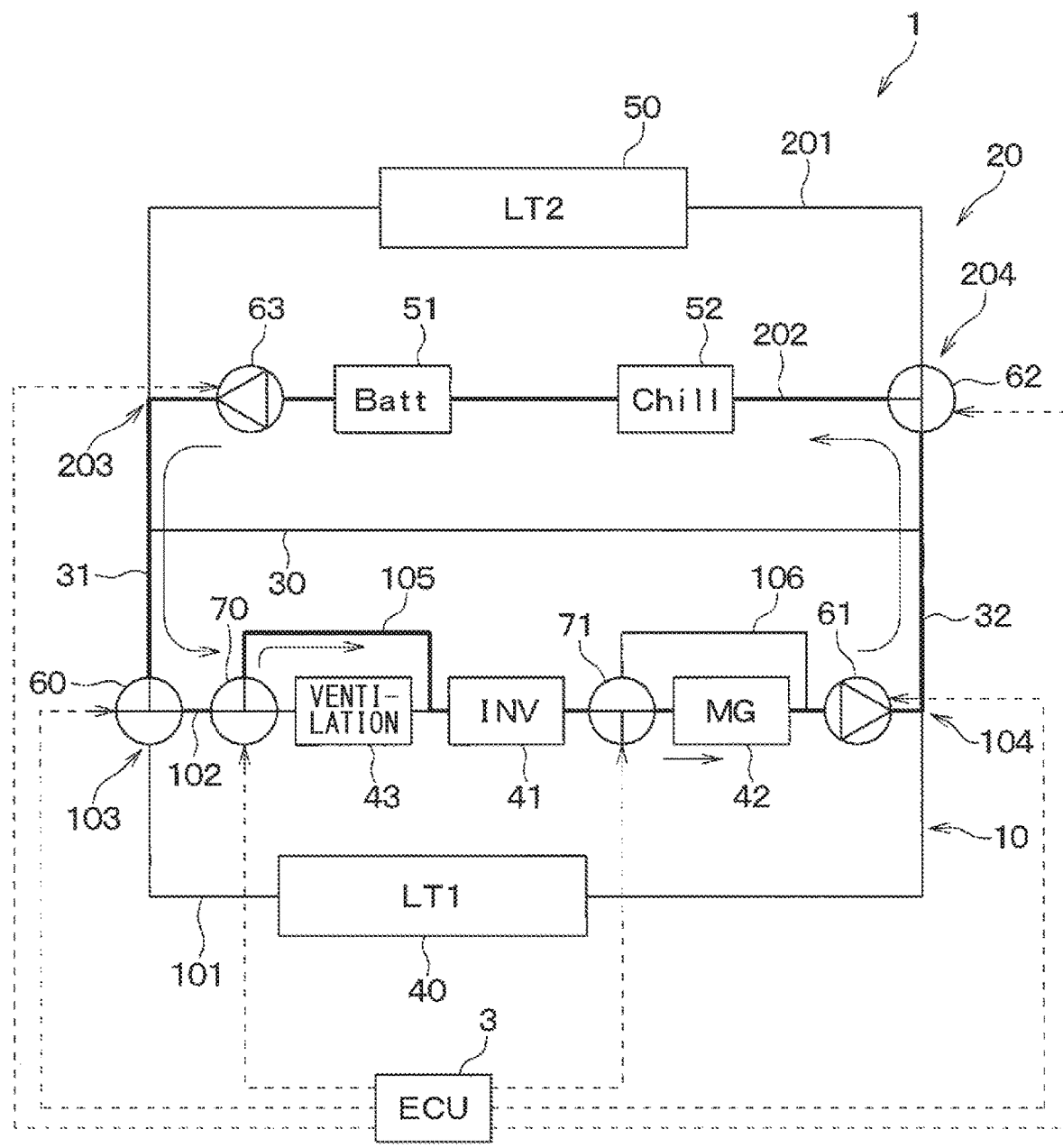
FIG. 7 is a diagram illustrating a flow of cooling water in a cooling water circuit.

When the temperature in the cabin is equal to or lower than the temperature of the cooling water flowing into the ventilation heat exchanger 43, the ECU 3 controls the third switching valve 70 to cause the cooling water to flow from the third switching valve 70 to the ventilation bypass circuit 105 in S102. In the present embodiment, as shown in FIG. 7, the third switching valve 70 is controlled so that all the cooling water flowing out from the third switching valve 70 flows into the ventilation bypass circuit 105, and the process proceeds to S106.

As a result, the cooling water does not flow from the third switching valve 70 into the ventilation heat exchanger 43, so that the low temperature air discharged to the outside of the cabin cannot cool the cooling water flowing through the ventilation heat exchanger 43.

When the temperature in the cabin is higher than the temperature of the cooling water flowing into the ventilation heat exchanger 43, the ECU 3 controls the third switching valve 70 so that the cooling water flows from the third switching valve 70 to the ventilation heat exchanger 43 at S104.

As a result, the cooling water flowing out from the third switching valve 70 flows into the ventilation heat exchanger 43, so that the cooling water flowing through the ventilation heat exchanger 43 is heated by the heat of the air discharged to the outside of the cabin.

Next, the ECU 3 determines whether or not the temperature of the oil of the motor generator is equal to or lower than the first threshold value A. Specifically, the temperature of the oil circulating inside the motor generator is specified based on the signal indicating the temperature of the oil circulating inside the motor generator. Then, it is determined whether the temperature of the oil is equal to or lower than the first threshold value A. The first threshold value A can be set to, for example, 80° C.

When the temperature of the oil of the motor generator is equal to or lower than the first threshold value A, the ECU 3 determines in S110 whether the temperature of the oil of the motor generator is equal to or lower than the second threshold value B. The second threshold B can be set to, for example, 10° C.

When the temperature of the oil of the motor generator is equal to or lower than the second threshold value B, the ECU 3 determines in S114 whether the temperature of the cooling water flowing between the ventilation heat exchanger 43 and the motor flow rate controller is higher than the oil temperature of the motor generator. Specifically, the temperature of the cooling water flowing into the motor generator cooling unit 42 is specified based on the signal indicating the temperature of the cooling water flowing into the motor generator cooling unit 42. Then, it is determined whether the temperature of the cooling water flowing into the motor generator cooling unit 42 is higher than the temperature of the oil of the motor generator.

When the temperature of the cooling water flowing into the motor generator cooling unit 42 is equal to or lower than the temperature of the oil of the motor generator, the ECU 3 controls the fourth switching valve 71 so that the cooling water flows into the motor bypass circuit 106 in S116, and this processing ends.

Figure 8:
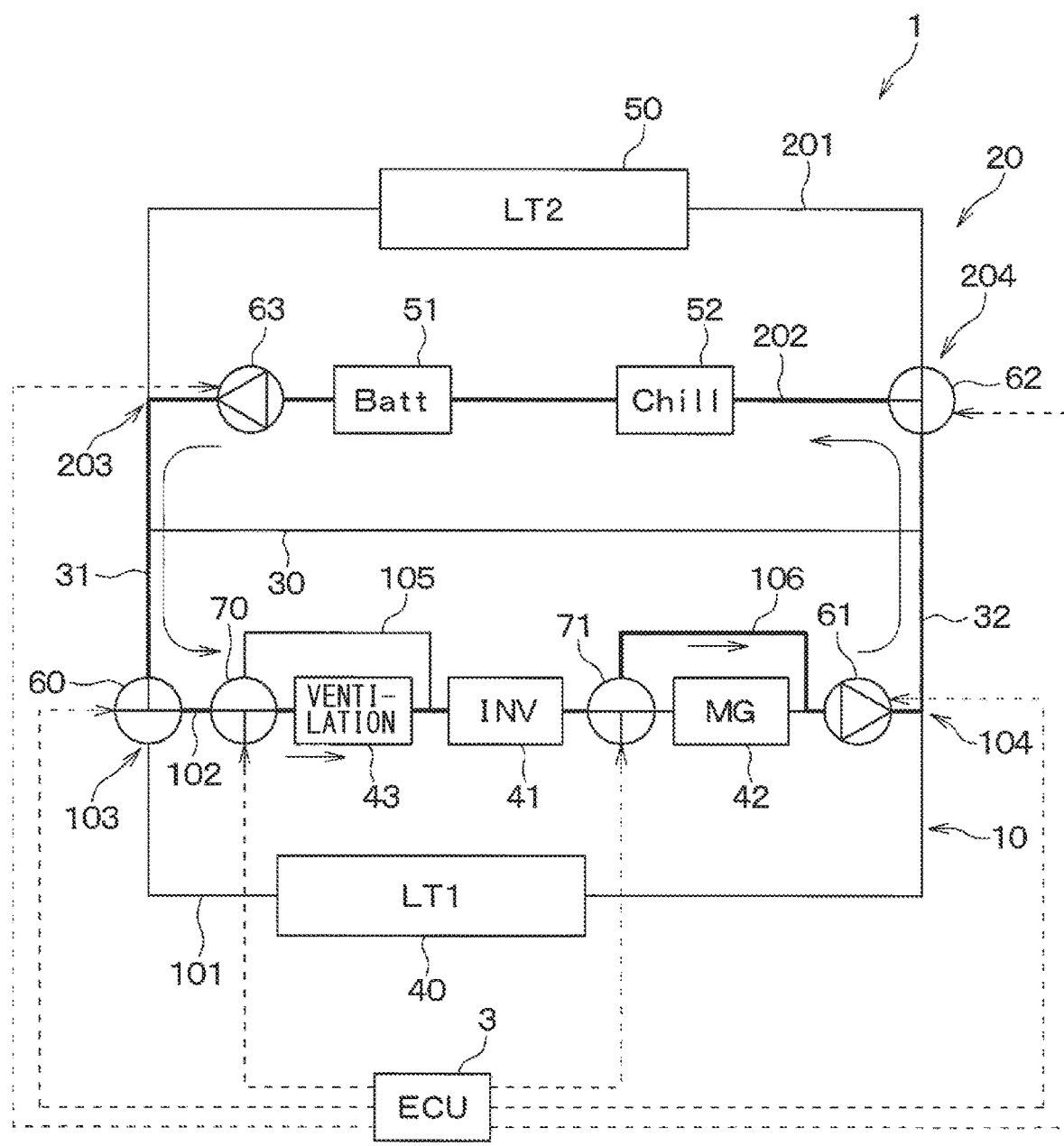
FIG. 8 is a diagram illustrating a flow of cooling water in a cooling water circuit.

As a result, as shown in FIG. 8, the cooling water that has passed through the ventilation heat exchanger 43, the inverter cooling unit 41, and the fourth switching valve 71 from the third switching valve 70 flows into the motor bypass circuit 106. That is, the cooling water heated by the ventilation heat exchanger 43 bypasses the motor generator cooling unit 42. Therefore, the oil of the motor generator is not cooled by the cooling water having a temperature lower than the temperature of the oil of the motor generator.

In some cases, when the temperature inside the cabin rises, the cooling water may be heated by the ventilation heat exchanger 43, and the temperature of the cooling water flowing into the motor generator cooling unit 42 may become higher than the temperature of the oil of the motor generator. In that case, the ECU 3 controls the fourth switching valve 71 so that the cooling water flows through the motor generator cooling unit 42 in S118, and the present processing ends.

Figure 9:
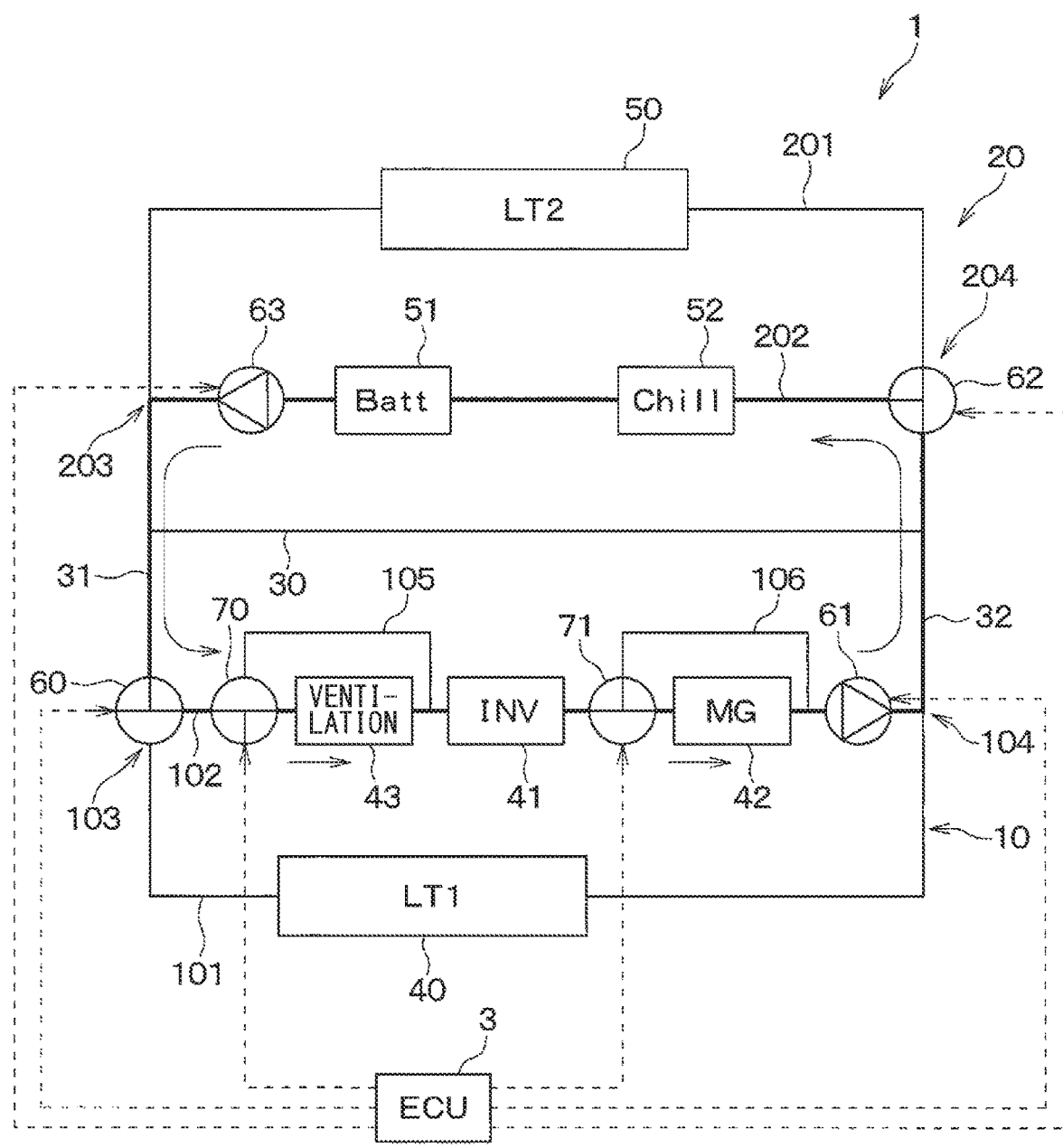
FIG. 9 is a diagram illustrating a flow of cooling water in a cooling water circuit.

As a result, as shown in FIG. 9, the cooling water that has passed through the ventilation heat exchanger 43, the inverter cooling unit 41, and the fourth switching valve 71 from the third switching valve 70 flows into the motor generator cooling unit 42. That is, since the cooling water heated by the ventilation heat exchanger 43 flows into the motor generator cooling unit 42, the oil circulating inside the motor generator can be warmed.

When the temperature of the oil of the motor generator becomes higher than the second threshold value B, the ECU 3 controls the fourth switching valve 71 in S112 so that the cooling water flows into the motor bypass circuit 106 as shown in FIG. 8, and this processing ends.

As described above, when the temperature of the oil of the motor generator is higher than the second threshold value B and is equal to or lower than the first threshold value A, it is not necessary to cool the motor generator and it is not necessary to heat the motor generator.

The ECU 3 controls the fourth switching valve 71 so that the cooling water flows into the motor bypass circuit 106, and can also control the fourth switching valve 71 so that the cooling water flows into the motor generator cooling unit 42.

As shown in FIG. 9, when the temperature of the oil of the motor generator becomes higher than the first threshold value A, the ECU 3 at S108 controls the fourth switching valve 71 to allow the cooling water to flow into the motor generator cooling unit 42.

As a result, the cooling water that has passed through the ventilation heat exchanger 43, the inverter cooling unit 41, and the fourth switching valve 71 from the third switching valve 70 flows into the motor generator cooling unit 42. That is, since the cooling water flows into the motor generator cooling unit 42, the motor generator can be cooled.

Figure 10:
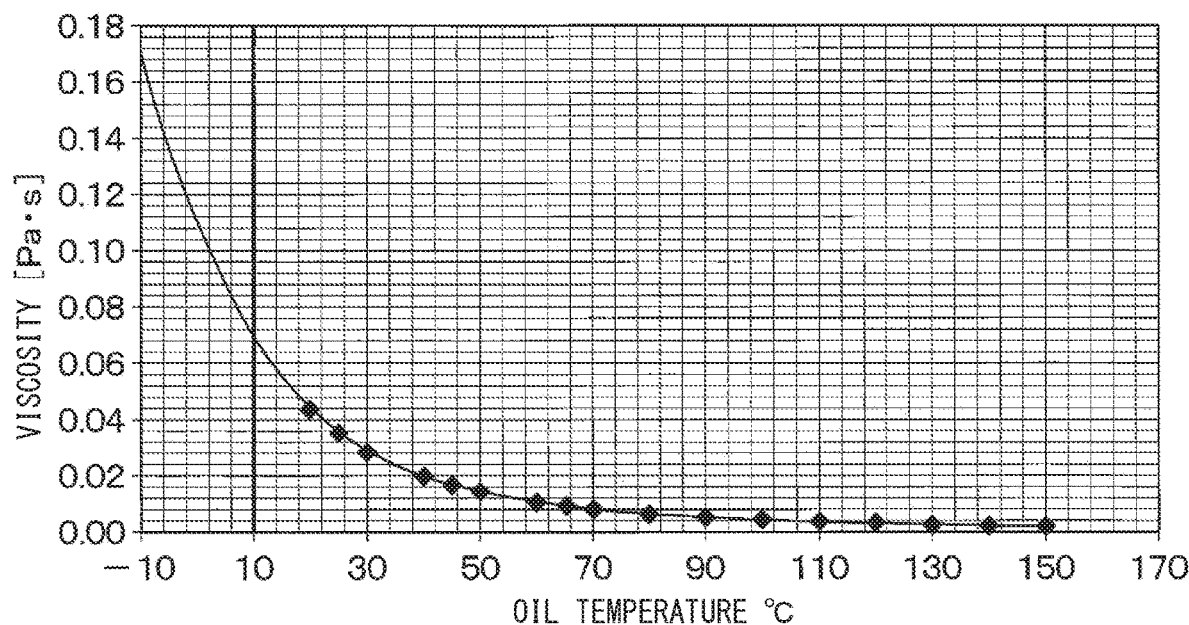
FIG. 10 is a diagram illustrating a viscosity of oil of a motor generator relative to temperature change.

When the outside air temperature is low, the viscous resistance of the oil of the motor generator increases, and the friction loss of the motor generator increases. As shown in FIG. 10, when the oil temperature is extremely low, the viscous resistance of the oil of the motor generator becomes very high, and the friction loss of the motor generator becomes large.

In the cooling apparatus of the present embodiment, when the cabin is warmed up, the cooling water is heated by the heat of the air discharged outside the cabin by the ventilation heat exchanger 43, and the oil circulating inside the motor generator can be quickly warmed.

The cooling apparatus of the present embodiment improves energy efficiency since the ventilation heat exchanger 43 recovers the heat of the air discharged from the cabin to the outside.

Figure 11:
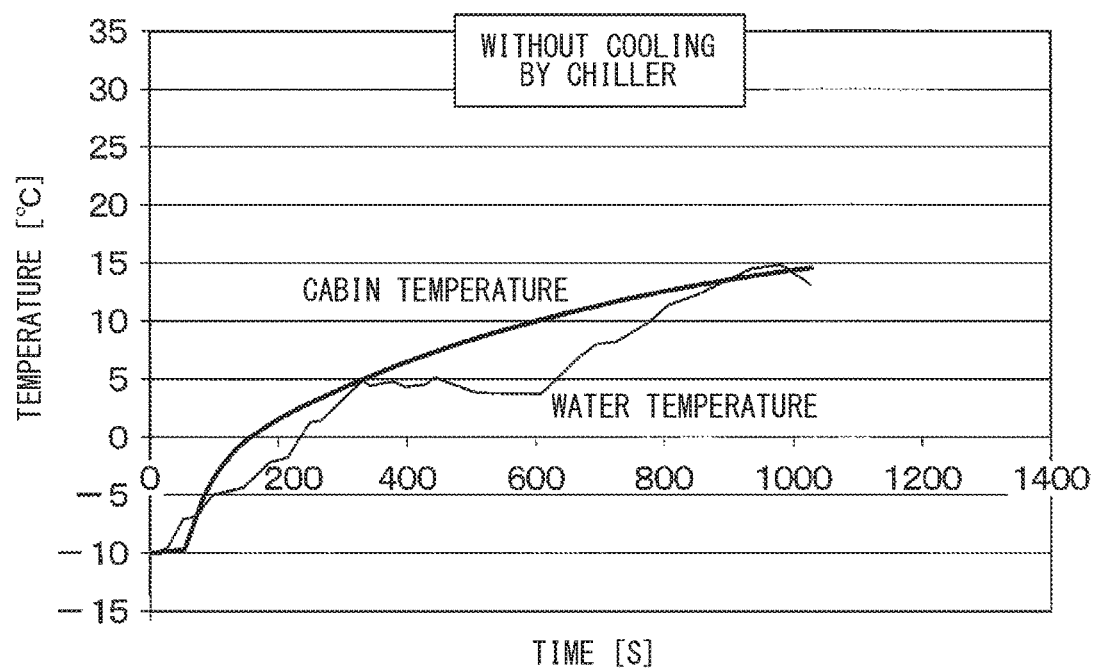
FIG. 11 is a diagram illustrating changes in temperature of the cooling water flowing through a ventilation heat exchanger and in temperature inside a cabin when the cooling water is not cooled by a chiller, which are calculated with a Lo-Mid pattern running of WLTC.

FIG. 11 shows changes in the temperature of the cooling water flowing through the ventilation heat exchanger 43 and the temperature inside the cabin when the cooling water is not cooled by the chiller 52. In FIG. 11, the water temperature of the cooling water flowing through the ventilation heat exchanger 43 and the cabin temperature are calculated by a Lo-Mid pattern running of WLTC which is a worldwide unified test cycle. WLTC is an abbreviation for Worldwide-harmonized Light vehicles Test Cycle.

When the cooling water is not cooled by the chiller 52, the difference between the cabin temperature and the temperature of cooling water flowing through the ventilation heat exchanger 43 is relatively small, so the amount of heat that can be recovered by the ventilation heat exchanger 43 is small.

Figure 12:
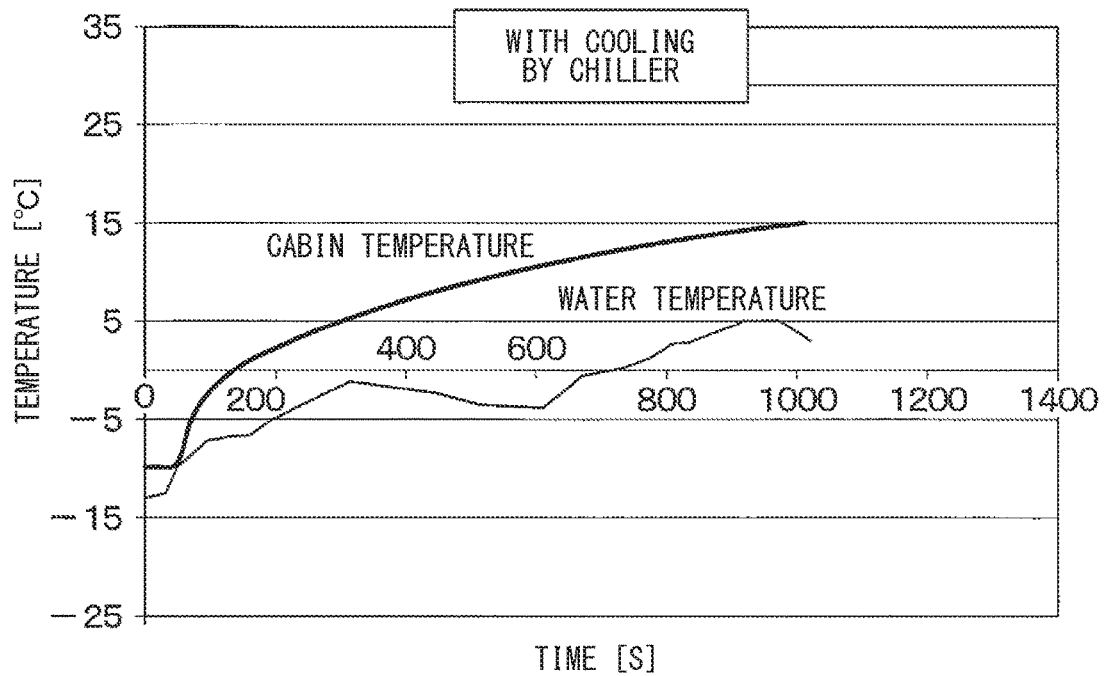
FIG. 12 is a diagram illustrating changes in temperature of the cooling water flowing through a ventilation heat exchanger and in temperature inside a cabin when the cooling water is cooled by a chiller, which are calculated with a Lo-Mid pattern running of WLTC.

FIG. 12 shows changes in the temperature of the cooling water flowing through the ventilation heat exchanger 43 and the temperature inside the cabin when the cooling water is cooled by the chiller 52. Similar to FIG. 11, FIG. 12 shows the values calculated by the Lo-Mid pattern running of WLTC.

When the cooling water is cooled by the chiller 52, the difference between the temperature of the cabin and the temperature of the cooling water flowing through the ventilation heat exchanger 43 becomes large. Therefore, the ventilation heat exchanger 43 can constantly recover heat of air discharged from the cabin to the outside.

Figure 13:
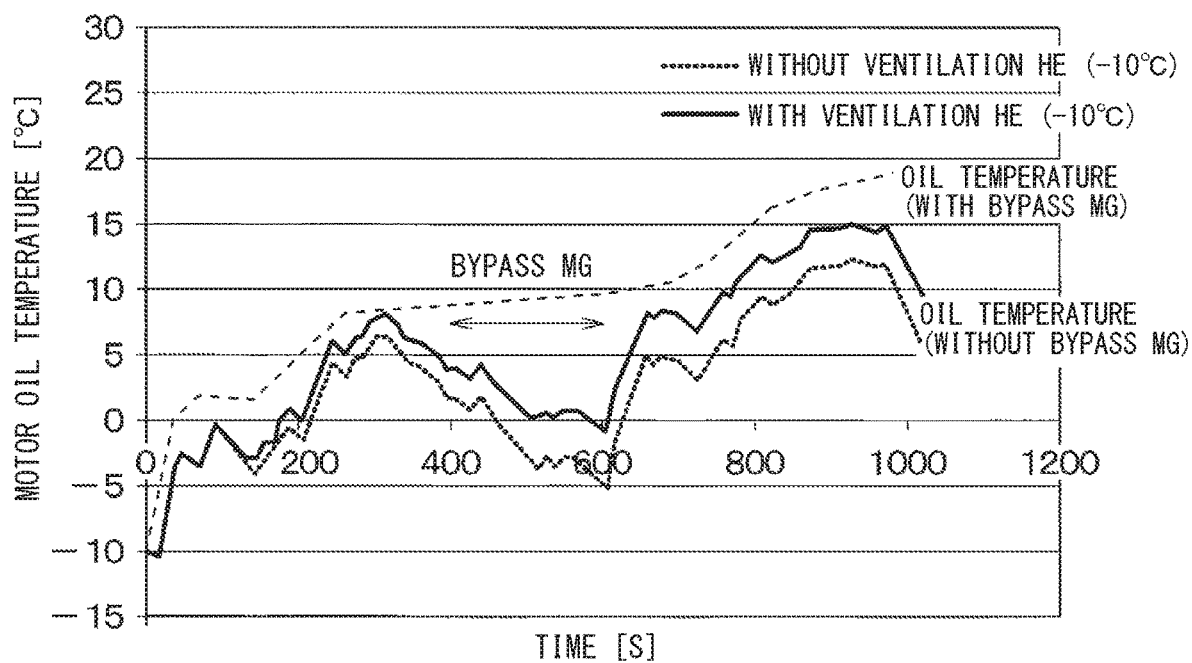
FIG. 13 is a diagram illustrating changes in temperature of oil of a motor generator, which are calculated with a Lo-Mid pattern running of WLTC.

FIG. 13 shows the temperature of the oil of the motor generator, which is calculated by the Lo-Mid pattern running of WLTC. The solid line in FIG. 13 represents the temperature of the oil of the motor generator having the ventilation heat exchanger 43 in which the cooling water flows from the ventilation heat exchanger 43 into the motor generator cooling unit 42. The thick dotted line in FIG. 13 represents the temperature of the oil of the motor generator not having the ventilation heat exchanger 43 in which the cooling water does not flow into the motor generator cooling unit 42. The thin dotted line in FIG. 13 indicates the temperature of the oil when the temperature of the cooling water flowing into the motor generator cooling unit 42 is lower than the temperature of the oil circulating inside the motor generator as in the process shown in FIG. 6. More specifically, the thin dotted line in FIG. 13 indicates the temperature of the oil of the motor generator in which the cooling water flowing out from the ventilation heat exchanger 43 flows through the motor bypass circuit 106 by bypassing the motor generator cooling unit 42.

The temperature of the oil of the motor generator is higher in the configuration having the ventilation heat exchanger 43 in which the cooling water flows from the ventilation heat exchanger 43 into the motor generator cooling unit 42, compared with the configuration not having the ventilation heat exchanger 43.

In some cases, when the temperature of the cooling water flowing into the motor generator cooling unit 42 is lower than the temperature of the oil circulating inside the motor generator, the cooling water flowing out from the ventilation heat exchanger 43 may flow through the motor bypass circuit 106 by bypassing the motor generator cooling unit 42. In this case, since the cooling water flows through the motor bypass circuit 106, the temperature of the oil circulating inside the motor generator can be kept high, so that the friction loss of the motor generator is improved.

When the temperature of the oil circulating inside the motor generator exceeds the second threshold value B, the cooling water flowing into the motor generator cooling unit 42 is diverted to the motor bypass circuit 106, thereby reducing the electric power by about 3%, compared with a case where the cooling water is caused to flow into the motor generator cooling unit 42.

As described above, the cooling apparatus of the present embodiment includes the water circuits 10, 20, 30, 31, 32 that circulate the cooling water to cool the motor generator that is the power source for traveling. Further, the ventilation heat exchanger 43 is provided for heating the cooling water by heat exchange between the cooling water flowing through the water circuit and the air discharged from the cabin to the outside of the cabin. Further, the motor generator cooling unit 42 is provided for cooling the motor generator by heat exchange between the cooling water flowing out from the ventilation heat exchanger 43 and the motor generator.

Further, the motor bypass circuit 106 is provided, which allows the cooling water flowing out from the ventilation heat exchanger 43 to bypass the motor generator cooling unit 42. In addition, the fourth switching valve 71 is provided, corresponding to a motor flow rate controller, to adjust a flow rate of cooling water flowing from the ventilation heat exchanger 43 to the motor generator cooling unit 42 and a flow rate of cooling water flowing from the ventilation heat exchanger 43 to the motor bypass circuit 106.

Further, a temperature determiner S114 is provided to determine whether or not the temperature of the cooling water flowing from the ventilation heat exchanger 43 into the motor generator cooling unit 42 is higher than the temperature of the oil circulating inside the motor generator. S114 corresponds to a first temperature determiner.

In S116 and S118 corresponding to a flow rate control unit, the following processing is performed. In some cases, the temperature determiner S114 may determine that the temperature of the cooling water flowing out from the ventilation heat exchanger 43 into the motor generator cooling unit 42 is higher than the temperature of the oil circulating inside the motor generator. In that case, the motor flow rate controller is controlled to increase the flow rate of the cooling water flowing from the ventilation heat exchanger 43 into the motor generator cooling unit 42. Further, it may be determined that the temperature of the cooling water flowing into the motor generator is equal to or lower than the temperature of the oil circulating inside the motor generator. In that case, the motor flow rate controller is controlled so as to increase the flow rate of the cooling water flowing from the ventilation heat exchanger 43 into the motor bypass circuit 106. S116 and S118 correspond to a first flow rate control unit.

Accordingly, the ventilation heat exchanger 43 heats the cooling water by heat exchange between the cooling water flowing through the water circuit and the air discharged from the cabin to the outside of the cabin, so that the energy efficiency is improved.

Furthermore, in S116 and S118 corresponding to the flow rate control unit, the following processing is performed. In some cases, the temperature determiner S114 may determine that the temperature of the cooling water flowing out from the ventilation heat exchanger 43 into the motor generator cooling unit 42 is higher than the temperature of the oil circulating inside the motor generator. In that case, the motor flow rate controller is controlled to increase the flow rate of the cooling water flowing from the ventilation heat exchanger 43 into the motor generator cooling unit 42. Further, it may be determined that the temperature of the cooling water flowing between the ventilation heat exchanger 43 and the motor flow rate controller is equal to or lower than the temperature of the oil circulating inside the motor generator. In that case, the fourth switching valve 71 is controlled so as to increase the flow rate of the cooling water flowing from the ventilation heat exchanger 43 into the motor bypass circuit 106. Therefore, it is possible to restrict the oil of the motor generator from being cooled by the cooling water, and it is possible to reduce the friction loss of the motor generator.

Further, the cooling apparatus of the present embodiment includes the chiller 52 that cools the cooling water by exchanging heat between the cooling water that has flowed out of the motor generator cooling unit 42 and the refrigerant of the refrigeration cycle that constitutes the air conditioning device for the cabin. In this way, the cooling water can be cooled by the chiller 52 by exchanging heat with the refrigerant of the refrigeration cycle.

The cooling apparatus of the present embodiment includes the ventilation bypass circuit 105 that allows the cooling water flowing in the water circuit to bypass the ventilation heat exchanger 43. In addition, the third switching valve 70 is provided, corresponding to a ventilation flow rate controller, to adjust the flow rate of cooling water flowing from the chiller to the ventilation heat exchanger 43 and the flow rate of cooling water flowing from the chiller to the ventilation bypass circuit. In addition, the second temperature determiner S100 is provided to determine whether or not the temperature of the air inside the cabin that flows into the ventilation heat exchanger 43 is higher than the temperature of the cooling water that flows into the ventilation heat exchanger 43.

Further, in S102 and S104 corresponding to a second flow rate control unit, the following processing is performed. When the second temperature determiner determines that the temperature of the air in the cabin is higher than the temperature of the cooling water flowing into the ventilation heat exchanger 43, the flow rate of the cooling water flowing into the ventilation heat exchanger 43 is increased by controlling the ventilation flow rate controller. Further, when it is determined that the temperature of the air in the cabin is equal to or lower than the temperature of the cooling water flowing into the ventilation heat exchanger 43, the ventilation flow rate controller is controlled to increase the flow rate of the cooling water flowing into the ventilation bypass circuit.

Therefore, the ventilation heat exchanger 43 can efficiently recover the heat of the air discharged from the cabin to the outside by allowing the cooling water cooled by the chiller to flow into the ventilation heat exchanger 43. That is, the ventilation heat exchanger 43 can efficiently recover the heat of the air discharged from the cabin to the outside by cooling the cooling water with the chiller. However, if the cooling water is cooled by the chiller, it becomes difficult to quickly warm the oil circulating inside the motor generator.

However, in the cooling apparatus of the present embodiment, it may be determined that the temperature of the cooling water flowing between the ventilation heat exchanger 43 and the motor flow rate controller is equal to or lower than the temperature of the oil circulating inside the motor generator. In that case, the motor flow rate controller is controlled so as to increase the flow rate of the cooling water flowing from the ventilation heat exchanger 43 into the motor bypass circuit 106. Therefore, it is possible to restrict the oil of the motor generator from being cooled by the cooling water, and it is possible to reduce the friction loss of the motor generator.

Further, the processes of S102 and S104, corresponding to a second flow rate control unit, are as follows. When the second temperature determiner determines that the temperature of the air in the cabin is higher than the temperature of the cooling water flowing into the ventilation heat exchanger 43, the flow rate of the cooling water flowing into the ventilation heat exchanger 43 is increased by controlling the third switching valve 70. Further, when it is determined that the temperature of the air in the cabin is equal to or lower than the temperature of the cooling water flowing into the ventilation heat exchanger 43, the third switching valve 70 is controlled to increase the flow rate of the cooling water flowing into the ventilation bypass circuit. Therefore, when the temperature of the air in the cabin is equal to or lower than the temperature of the cooling water flowing into the ventilation heat exchanger 43, it is possible to restrict the cooling water from being cooled by the air in the cabin.

The cooling apparatus of the present embodiment includes an oil temperature determiner S106 that determines whether or not the temperature of the oil circulating inside the motor generator is lower than or equal to a threshold value. Further, a third flow rate control unit S108 is provided to control the fourth switching valve 71 so that the cooling water flows from the ventilation heat exchanger 43 to the motor generator cooling unit 42, when the oil temperature determiner determines that the temperature of the oil circulating inside the motor generator is not lower than or equal to the threshold value.

Therefore, when the temperature of the oil circulating inside the motor generator becomes high and becomes higher than the threshold value, the motor generator can be cooled by the cooling water.

The processing of S114 corresponding to the temperature determiner is as follows. In S106 corresponding to the oil temperature determiner, it may be determined that the temperature of the oil circulating inside the motor generator is equal to or lower than the threshold value. In such a case, it is determined whether the temperature of the cooling water flowing from the ventilation heat exchanger 43 into the motor generator cooling unit 42 is higher than the temperature of the oil circulating inside the motor generator.

Thus, the temperature of the oil circulating inside the motor generator can be determined.

The cooling apparatus of the present embodiment includes the water circuit 10, 20, 30, 31, 32 that circulates cooling water to cool the motor generator that is a power source for traveling. Further, the ventilation heat exchanger 43 is provided for heating the cooling water by exchanging heat between the cooling water flowing through the water circuit 10, 20, 30, 31, 32 and the air discharged from the cabin to the outside of the cabin. Further, the motor generator cooling unit 42 is provided for cooling the motor generator by exchanging heat between the cooling water flowing out from the ventilation heat exchanger 43 and the motor generator. Further, the motor bypass circuit 106 is provided, which allows the cooling water flowing out from the ventilation heat exchanger 43 to bypass the motor generator cooling unit 42. Further, the fourth switching valve 71 is provided for adjusting the flow rate of the cooling water flowing from the ventilation heat exchanger 43 into the motor generator cooling unit 42 and the flow rate of the cooling water flowing from the ventilation heat exchanger 43 into the motor bypass circuit 106. Further, the ECU 3 is provided corresponding to a control unit that controls the motor flow rate controller.

In this way, since the ventilation heat exchanger 43 heats the cooling water by heat exchange between the cooling water flowing through the water circuit 10, 20, 30, 31, 32 and the air discharged from the cabin to the outside of the cabin, the energy efficiency can be improved.

Further, the ECU 3 can control the motor flow rate controller so as to increase the flow rate of the cooling water flowing from the ventilation heat exchanger 43 into the motor generator cooling unit 42. Further, the ECU 3 can control the motor flow rate controller so as to increase the flow rate of the cooling water flowing from the ventilation heat exchanger 43 into the motor bypass circuit 106. Therefore, it is possible to restrict the oil of the motor generator from being cooled by the cooling water, and it is possible to reduce the friction loss of the motor generator.

Other Embodiments (1) It is preferable that each of the first switching valve 60 and the second switching valve 62 is made of a three-way valve. The number of valves can be minimized by configuring each of the first switching valve 60 and the second switching valve 62 with a three-way valve. The first switching valve 60 and the second switching valve 62 are not limited to the three-way valve and may be configured by a combination of two-way valve and four-way valve that can exhibit the above-described functions.

(2) In the above embodiment, the battery cooling unit 51 and the inverter cooling unit 41 are provided, but at least one of the battery cooling unit 51 and the inverter cooling unit 41 can be omitted. It is also possible to cool components other than the battery cooling unit 51 and the inverter cooling unit 41. The first pump 61 may be located at another position on the second cooling water channel 102, for example, between the first switching valve 60 and the third switching valve 70.

(3) In the above embodiment, for example, the third switching valve 70 is controlled so that all the cooling water flowing out from the third switching valve 70 flows into the ventilation bypass circuit 105 or the ventilation heat exchanger 43.

Alternatively, for example, the third switching valve 70 can be controlled so that a part of the cooling water flowing out from the third switching valve 70 flows into the ventilation heat exchanger 43.

Regarding the fourth switching valve 71, similarly, the fourth switching valve 71 can be controlled so that a part of the cooling water flowing out from the fourth switching valve 71 flows into the motor bypass circuit 106 or the motor generator cooling unit 42.

(4) In the above embodiment, the ventilation bypass circuit 105 is provided between the first connection 103 and the inverter cooling unit 41 to bypass the ventilation heat exchanger 43 for the cooling water from the first connection 103. When it is determined in S100 that the temperature of the air in the cabin flowing into the ventilation heat exchanger 43 is equal to or lower than the temperature of the cooling water flowing into the ventilation heat exchanger 43, the ventilation flow rate controller is controlled so as to increase the flow rate of the cooling water that flows into the ventilation bypass circuit in S102.

Alternatively, it is also possible to provide an unillustrated ventilation heat exchanger bypass circuit that bypasses the ventilation heat exchanger 43 arranged in an exhaust passage that discharges air from the cabin to the outside of the cabin. Furthermore, an unillustrated flow rate controller may be provided to adjust the flow rate of air flowing into the ventilation heat exchanger 43 and the flow rate of air flowing into the ventilation heat exchanger bypass circuit. In S100, it may be determined that the temperature of the air flowing from the cabin into the ventilation heat exchanger 43 is equal to or lower than the temperature of the cooling water flowing into the ventilation heat exchanger 43. In that case, the flow rate control unit can be controlled so as to increase the flow rate of the air flowing into the ventilation heat exchanger bypass circuit in S102.

(5) In the embodiment, a predetermined control is performed when it is determined in S114 that the temperature of the cooling water flowing between the ventilation heat exchanger 43 and the motor flow rate controller is equal to or lower than the temperature of the oil circulating inside the motor generator. That is, in S116, the motor flow rate controller is controlled to increase the flow rate of the cooling water flowing from the ventilation heat exchanger 43 into the motor bypass circuit 106.

Another control may be performed when it is determined in S114 that the temperature of the cooling water flowing between the ventilation heat exchanger 43 and the motor flow rate controller is equal to or lower than the temperature of the oil circulating inside the motor generator. That is, in S116, the operation of the oil pump for circulating the oil inside the motor generator may be stopped.

The present disclosure is not limited to the above-described embodiments, and can be appropriately modified. Individual elements or features of a particular embodiment are generally not limited to that particular embodiment, but, where applicable, are interchangeable and can be used in a selected embodiment, even if not specifically shown or described. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

Overview

According to the first aspect represented by a part or all of the embodiment, a cooling apparatus includes a water circuit configured to circulate cooling water to cool a motor generator that is a power source for traveling. The cooling apparatus includes: a ventilation heat exchanger in which heat is exchanged between the cooling water flowing through the water circuit and air discharged from inside of a cabin to outside of the cabin to heat the cooling water; and a motor generator cooling unit configured to cool the motor generator by heat exchange between the cooling water flowing out of the ventilation heat exchanger and the motor generator. The cooling apparatus includes a motor bypass circuit that bypasses the motor generator cooling unit for the cooling water flowing out of the ventilation heat exchanger. The cooling apparatus includes a motor flow rate controller configured to control a flow rate of the cooling water flowing from the ventilation heat exchanger to the motor generator cooling unit and a flow rate of the cooling water flowing from the ventilation heat exchanger to the motor bypass circuit. The cooling apparatus includes a temperature determiner that determines whether a temperature of the cooling water flowing between the ventilation heat exchanger and the motor flow rate controller is higher than a temperature of oil circulating inside the motor generator. The cooling apparatus includes a flow rate control unit configured to control the motor flow rate controller to increase the flow rate of the cooling water flowing from the ventilation heat exchanger to the motor generator cooling unit when the temperature determiner determines that the temperature of the cooling water flowing between the ventilation heat exchanger and the motor flow rate controller is higher than the temperature of oil circulating inside the motor generator. The flow rate control unit is configured to control the motor flow rate controller to increase the flow rate of the cooling water flowing from the ventilation heat exchanger to the motor bypass circuit when the temperature determiner determines that the temperature of the cooling water flowing between the ventilation heat exchanger and the motor flow rate controller is lower than or equal to the temperature of oil circulating inside the motor generator.

According to the second aspect, a chiller is provided to cool the cooling water by exchanging heat between the cooling water flowing out of the motor generator cooling unit and refrigerant of a refrigeration cycle that constitutes an air conditioner for a cabin. In this way, the cooling water can be cooled by the chiller that cools the cooling water by heat exchange with the refrigerant of the refrigeration cycle.

According to the third aspect, the temperature determiner is a first temperature determiner, and the flow rate control unit is a first flow rate control unit. The cooling apparatus further includes: a ventilation bypass circuit that bypasses the ventilation heat exchanger for the cooling water flowing through the water circuit; and a ventilation flow rate controller configured to control a flow rate of the cooling water flowing into the ventilation heat exchanger and a flow rate of the cooling water flowing into the ventilation bypass circuit. The cooling apparatus includes a second temperature determiner that determines whether a temperature of air that flows into the ventilation heat exchanger from the cabin is higher than the temperature of the cooling water that flows into the ventilation heat exchanger. The cooling apparatus has a second flow rate control unit that controls the ventilation flow rate controller to increase the flow rate of the cooling water flowing into the ventilation heat exchanger, when the second temperature determiner determines that the temperature of the air in the cabin is higher than the temperature of the cooling water flowing into the ventilation heat exchanger. The second flow rate control unit controls the ventilation flow rate controller to increase the flow rate of the cooling water flowing into the ventilation bypass circuit, when the second temperature determiner determines that the temperature of the air in the cabin is equal to or lower than the temperature of the cooling water flowing into the ventilation heat exchanger.

In this way, the ventilation flow rate controller is provided to adjust the flow rate of cooling water flowing into the ventilation heat exchanger and the flow rate of cooling water flowing into the ventilation bypass circuit, so that it is possible to efficiently recover the heat of air discharged by the ventilation heat exchanger from the inside to the outside of the cabin.

According to the fourth aspect, the cooling apparatus has the oil temperature determiner S106 that determines whether the temperature of the oil circulating inside the motor generator is equal to or lower than a threshold value. The cooling apparatus has the third flow rate control unit S108 that controls the motor flow rate control unit so that the cooling water flows from the ventilation heat exchanger to the motor generator cooling unit, when the oil temperature determiner determines that the temperature of the oil circulating inside the motor generator is not lower than or equal to the threshold value.

Therefore, when the temperature of the oil circulating inside the motor generator becomes higher than the threshold value, the motor generator can be cooled by the cooling water.

According to the fifth aspect, the temperature determiner determines whether the temperature of the cooling water flowing from the ventilation heat exchanger to the motor generator cooling unit is higher than the temperature of the oil circulating inside the motor generator, when the oil temperature determiner determines that the temperature of the oil circulating inside the motor generator is equal to or lower than the threshold value Thus, when the oil temperature determiner determines that the temperature of the oil circulating inside the motor generator is equal to or lower than the threshold value, the temperature determiner can determine whether the temperature of the cooling water flowing from the ventilation heat exchanger into the motor generator cooling unit is higher than the temperature of the oil circulating inside the motor generator.

According to the sixth aspect, the cooling apparatus of the present embodiment includes a water circuit configured to circulate cooling water to cool a motor generator that is a power source for traveling. The cooling apparatus includes a ventilation heat exchanger in which heat is exchanged between the cooling water flowing through the water circuit and air discharged from inside of a cabin to outside of the cabin to heat the cooling water. The cooling apparatus includes a motor generator cooling unit configured to cool the motor generator by heat exchange between the cooling water flowing out of the ventilation heat exchanger and the motor generator. The cooling apparatus includes a motor bypass circuit that bypasses the motor generator cooling unit for the cooling water flowing out of the ventilation heat exchanger. The cooling apparatus includes a motor flow rate controller configured to control a flow rate of the cooling water flowing from the ventilation heat exchanger to the motor generator cooling unit and a flow rate of the cooling water flowing from the ventilation heat exchanger to the motor bypass circuit. The cooling apparatus includes a control unit configured to control the motor flow rate controller.

In this way, the ventilation heat exchanger heats the cooling water by heat exchange between the cooling water flowing in the water circuit and the air discharged from the cabin to the outside of the cabin, so that the energy efficiency can be improved.

The control unit controls the motor flow rate controller to increase the flow rate of the cooling water flowing from the ventilation heat exchanger to the motor generator cooling unit, and controls the motor flow rate controller to increase the flow rate of the cooling water flowing from the ventilation heat exchanger to the motor bypass circuit. Therefore, it is possible to restrict the oil of the motor generator from being cooled by the cooling water, so as to reduce the friction loss of the motor generator.

In the embodiment, the first circuit 10, the second circuit 20, the bypass passage 30, the first connection passage 31, and the second connection passage 32 correspond to a water circuit. The process of S114 corresponds to a temperature determiner, and the processes of S116 and S118 correspond to a flow rate control unit. The processes of S102 and S104 correspond to a second flow rate control unit, and the process of S106 corresponds to an oil temperature determiner. The process of S108 corresponds to a third flow rate control unit.

What is claimed is:
1. A cooling apparatus comprising:
a water circuit configured to circulate cooling water to cool a motor generator that is a power source for traveling;
a ventilation heat exchanger in which heat is exchanged between the cooling water flowing through the water circuit and air discharged from inside of a cabin to outside of the cabin to heat the cooling water;
a motor generator cooling unit configured to cool the motor generator by heat exchange between the cooling water flowing out of the ventilation heat exchanger and the motor generator;
a motor bypass circuit that bypasses the motor generator cooling unit for the cooling water flowing out of the ventilation heat exchanger;

a motor flow rate controller configured to control a flow rate of the cooling water flowing from the ventilation heat exchanger to the motor generator cooling unit and a flow rate of the cooling water flowing from the ventilation heat exchanger to the motor bypass circuit;

a temperature determiner that determines whether a temperature of the cooling water flowing between the ventilation heat exchanger and the motor flow rate controller is higher than a temperature of oil circulating inside the motor generator; and a flow rate control unit configured to control the motor flow rate controller to increase the flow rate of the cooling water flowing from the ventilation heat exchanger to the motor generator cooling unit when the temperature determiner determines that the temperature of the cooling water flowing between the ventilation heat exchanger and the motor flow rate controller is higher than the temperature of oil circulating inside the motor generator, wherein the flow rate control unit is configured to control the motor flow rate controller to increase the flow rate of the cooling water flowing from the ventilation heat exchanger to the motor bypass circuit when the temperature determiner determines that the temperature of the cooling water flowing between the ventilation heat exchanger and the motor flow rate controller is lower than or equal to the temperature of oil circulating inside the motor generator.

2. The cooling apparatus according to claim 1, further comprising a chiller configured to cool the cooling water by heat exchange between the cooling water flowing out of the motor generator cooling unit and a refrigerant of a refrigeration cycle that defines an air conditioner for the cabin.

3. The cooling apparatus according to claim 1, wherein the temperature determiner is a first temperature determiner, and the flow rate control unit is a first flow rate control unit, further comprising:

a ventilation bypass circuit that bypasses the ventilation heat exchanger for the cooling water flowing through the water circuit;

a ventilation flow rate controller configured to control a flow rate of the cooling water flowing into the ventilation heat exchanger and a flow rate of the cooling water flowing into the ventilation bypass circuit;

a second temperature determiner that determines whether a temperature of air that flows into the ventilation heat exchanger from the cabin is higher than a temperature of the cooling water that flows into the ventilation heat exchanger; and a second flow rate control unit that controls the ventilation flow rate controller to increase the flow rate of the cooling water flowing into the ventilation heat exchanger, when the second temperature determiner determines that the temperature of the air in the cabin is higher than the temperature of the cooling water flowing into the ventilation heat exchanger, wherein the second flow rate control unit controls the ventilation flow rate controller to increase the flow rate of the cooling water flowing into the ventilation bypass circuit, when the second temperature determiner determines that the temperature of the air in the cabin is equal to or lower than the temperature of the cooling water flowing into the ventilation heat exchanger.

4. The cooling apparatus according to claim 1 further comprising an oil temperature determiner configured to determine whether the temperature of the oil circulating inside the motor generator is lower than or equal to a threshold value; and a third flow rate control unit configured to control the motor flow rate controller so that the cooling water flows from the ventilation heat exchanger to the motor generator cooling unit, when the oil temperature determiner determines that the temperature of the oil circulating inside the motor generator is higher than the threshold value.

5. The cooling apparatus according to claim 4, wherein the temperature determiner determines whether the temperature of the cooling water that flows from the ventilation heat exchanger into the motor generator cooling unit is higher than the temperature of the oil circulating inside the motor generator, when the oil temperature determiner determines that the temperature of the oil circulating inside the motor generator is equal to or lower than the threshold value.

* * * * *